United States Patent
Lacaze et al.

(10) Patent No.: US 12,330,720 B1
(45) Date of Patent: Jun. 17, 2025

(54) REAR TRAILER HOSTLER

(71) Applicant: Robotic Research OpCo, LLC, Clarksburg, MD (US)

(72) Inventors: Alberto Daniel Lacaze, Potomac, MD (US); Karl Nicholas Murphy, Cocoa Beach, FL (US); Eric Meyer, Catonsville, MD (US); Rashmi Patel, North Bethesda, MD (US)

(73) Assignee: Robotic Research OpCo, LLC, Clarksburg, MD (US)

( * ) Notice: Subject to any disclaimer, the term of this patent is extended or adjusted under 35 U.S.C. 154(b) by 729 days.

(21) Appl. No.: 17/513,576

(22) Filed: Oct. 28, 2021

Related U.S. Application Data

(60) Provisional application No. 63/106,714, filed on Oct. 28, 2020.

(51) Int. Cl.
   *B62D 53/08* (2006.01)
   *B62D 53/12* (2006.01)

(52) U.S. Cl.
   CPC ..... *B62D 53/0864* (2013.01); *B62D 53/0878* (2013.01); *B62D 53/0885* (2013.01); *B62D 53/0892* (2013.01); *B62D 53/12* (2013.01)

(58) Field of Classification Search
   None
   See application file for complete search history.

(56) References Cited

U.S. PATENT DOCUMENTS

| | | | |
|---|---|---|---|
| 6,109,845 A * | 8/2000 | Kerr | B60P 3/122 410/56 |
| 11,020,859 B2 | 6/2021 | Patrick et al. | |
| 11,099,560 B2 | 8/2021 | Smith et al. | |
| 11,312,415 B2 * | 4/2022 | Tzivanopoulos | B60S 13/00 |
| 11,429,099 B2 | 8/2022 | Smith et al. | |
| 11,492,055 B2 * | 11/2022 | Ibenthal | B60G 17/00 |
| 11,693,426 B2 * | 7/2023 | Tamura | G08G 1/20 701/2 |
| 11,981,554 B2 * | 5/2024 | Cord | B66F 9/0755 |
| 2007/0040353 A1 | 2/2007 | Dallaire et al. | |
| 2019/0322319 A1 | 10/2019 | Smith et al. | |
| 2020/0139950 A1 | 5/2020 | James et al. | |
| 2020/0264607 A1 | 8/2020 | Smith et al. | |
| 2020/0269425 A1 * | 8/2020 | Shikano | B25J 3/04 |
| 2021/0053407 A1 | 2/2021 | Smith et al. | |
| 2021/0316653 A1 | 10/2021 | Woodrough, Jr. | |

(Continued)

*Primary Examiner* — Mark C Hageman
(74) *Attorney, Agent, or Firm* — RowanTree Law Group, PLLC; Joseph W. Schmidt

(57) ABSTRACT

A rear trailer hostler can be used to move a parked trailer without otherwise disengaging pneumatic brakes thereof. For example, the rear trailer hostler can lift the wheels of the trailer off of the ground, thereby allowing a front hostler to move the trailer without a gladhands connection to the trailer pneumatic lines. Alternatively, the rear trailer hostler can move the trailer independently. For example, the trailer can be parked atop the rear trailer hostler and disconnected from the truck. With the rear trailer hostler supporting the locked wheels and the landing gear, the trailer can be moved without requiring the pneumatic brakes to be disengaged. The rear trailer hostler can also provide one or more safety or convenience features, such as a bridging platform or a safety door stop.

20 Claims, 16 Drawing Sheets

(56) References Cited

U.S. PATENT DOCUMENTS

| | | | |
|---|---|---|---|
| 2022/0024529 A1* | 1/2022 | Clauer | B62D 53/12 |
| 2022/0155782 A1 | 5/2022 | Smith et al. | |
| 2022/0307281 A1* | 9/2022 | Globerman | B60S 9/22 |

* cited by examiner

REAR TRAILER HOSTLER

CROSS-REFERENCE TO RELATED APPLICATIONS

This application claims benefit of and priority under 35 U.S.C. § 119 (e) to, and is a Non-provisional of U.S. Provisional Patent Application No. 63/106,714 filed on Oct. 28, 2020 and titled "Rear Trailer Hostler," which is hereby incorporated by reference herein in its entirety.

FIELD

The present disclosure relates generally to transport of semi-trailers, and more particularly, to rear trailer hostlers for moving parked semi-trailers without disengaging pneumatic air brakes thereof.

BACKGROUND

An 18-wheeler or tractor-trailer truck includes a semi-trailer (also referred to herein as "trailer") releasably coupled to a tractor (also referred to herein as "truck"). At distribution centers, marine terminals, rail heads, etc., the trailer is often disconnected from the truck, for example, for cargo loading, cargo unloading, storage, or changing between trucks. In such locations, rather than the truck used for road hauling, the trailer can be moved about by a specialized local tractor (also referred to herein as "hostler," "yard dog," "terminal tractor," or "shunt truck"). However, trailers have pneumatic brakes that mechanically engage when the tractor's pressurized pneumatic lines are disconnected (e.g., via gladhands couplers on the trailer). Thus, to allow movement of the trailer by the hostler in existing systems, the trailer brakes have to be disengaged by pressurizing the pneumatic lines. This requires manually connecting pneumatic lines between hostler and the trailer, as automatic connection tends to be difficult or subject to failure. Not only does manual connection of pneumatic lines require additional time and subject a user to potential risk, but it also limits the adoption of automation, for example, by automating operation of the hostler to move trailers at such locations.

Embodiments of the disclosed subject matter may address one or more of the above-noted problems and disadvantages, among other things.

SUMMARY

Embodiments of the disclosed subject matter provide rear trailer hostlers, and systems and methods for use thereof. In some embodiments, a rear trailer hostler can be positioned underneath a parked trailer and can lift the wheels of the trailer off the ground, for example, by contact with the trailer tires, the trailer axle, the trailer rear fender, or any combination thereof. A fifth wheel of a front hostler can be coupled to the trailer, and the front hostler and rear trailer hostler can cooperate to move the trailer without otherwise disengaging the pneumatic brakes of the trailer. In some embodiments, the operation of the front hostler, the rear trailer hostler, or both can be autonomous or semi-autonomous (e.g., where the front hostler is manually driven and the rear trailer hostler actively follows the front hostler).

Alternatively or additionally, in some embodiments, a tractor can park a trailer on an upper support surface of the rear trailer hostler. For example, to access the upper support surface of the rear trailer hostler, one or more ramps can be used, or the rear trailer hostler can be disposed in a below-grade area of the parking lot or road. The tractor can then disengage from the parked trailer, and the rear trailer hostler can independently move the trailer without otherwise disengaging the pneumatic brakes of the trailer. In some embodiments, the ramp(s) is an actuatable part of the rear trailer hostler, and can be retracted or otherwise positioned in a stowed configuration for transporting the trailer.

In some embodiments, the rear trailer hostler can have an actuatable platform that provides a bridge between the cargo bed of the trailer and a floor of a loading dock or other loading/unloading location (e.g., cargo bed of another trailer). In some embodiments, an actuatable ramp of the rear trailer hostler for loading the trailer onto the rear trailer hostler can be repurposed to serve as the bridge between the cargo bed of the trailer and a loading floor. In some embodiments, the bridge can include door safety stops that can be automatically or manually extended to protect a person at a rear of the trailer.

In a representative embodiment, a system for moving a parked trailer can comprise one or more rear trailer hostlers. Each rear trailer hostler can comprise a vehicle chassis, a trailer lift unit, one or more sensors, and a control system. The vehicle chassis can have a plurality of wheels and a propulsion unit constructed to drive the plurality of wheels. The trailer lift unit can be disposed on the vehicle chassis. The one or more sensors can be configured to detect the trailer, characteristics of the trailer, or features in an environment surrounding the trailer. The control system can be operatively coupled to the vehicle chassis, the trailer lift unit, and the one or more sensors. The control system can comprise one or more processors and at least one memory storing computer-readable instructions that, when executed by the one or more processors, cause the one or more processors to position, via the propulsion unit, the vehicle chassis underneath the trailer at a first location; actuate the trailer lift unit so as to raise the trailer from an initial height where locked wheels of the trailer contact a ground to a second height where the locked wheels are held off the ground; and maintain, via the trailer lift unit, the locked wheels off the ground as the vehicle chassis and the trailer thereon moves from the first location to a second location.

In another representative embodiment, an autonomous rear trailer hostler for moving a parked trailer can comprise a vehicle chassis, one or more sensors, and a control system. The vehicle chassis can have a plurality of wheels, a propulsion unit constructed to drive the plurality of wheels, and an upper support surface. The one or more sensors can be configured to detect the trailer, characteristics of the trailer, or features in an environment surrounding the trailer. The control system can be operatively coupled to the vehicle chassis and the one or more sensors. The control system can comprise one or more processors and at least one memory storing computer-readable instructions that, when executed by the one or more processors, cause the one or more processors to move, via the propulsion unit, the vehicle chassis with trailer thereon from a first location to a second location.

In another representative embodiment, a method can comprise positioning a rear trailer hostler with respect to a parked trailer. The method can further comprise lifting, using the rear trailer hostler, locked wheels of the trailer off of the ground. The method can also comprise connecting a front hostler to the trailer, and using the front and rear trailer hostlers to move the trailer while the wheels thereof remain locked.

In another representative embodiment, a method can comprise positioning wheels of a trailer on an upper support surface of a rear trailer hostler. The method can further comprise disconnecting a gladhands coupler from the trailer such that wheels of the trailer become locked. The method can also comprise using the rear trailer hostler to move the trailer while the wheels thereof remain locked.

Any of the various innovations of this disclosure can be used in combination or separately. This summary is provided to introduce a selection of concepts in a simplified form that are further described below in the detailed description. This summary is not intended to identify key features or essential features of the claimed subject matter, nor is it intended to be used to limit the scope of the claimed subject matter. The foregoing and other objects, features, and advantages of the disclosed technology will become more apparent from the following detailed description, which proceeds with reference to the accompanying figures.

BRIEF DESCRIPTION OF THE DRAWINGS

Where applicable, some elements may be simplified or otherwise not illustrated in order to assist in the illustration and description of underlying features. For example, in some figures, some components have been illustrated using a partial or cutaway view in order to illustrate internal interaction of components. Throughout the figures, like reference numerals denote like elements. An understanding of embodiments described herein and many of the attendant advantages thereof may be readily obtained by reference to the following detailed description when considered with the accompanying drawings, wherein.

DETAILED DESCRIPTION

I. Introduction

Figure 1A:
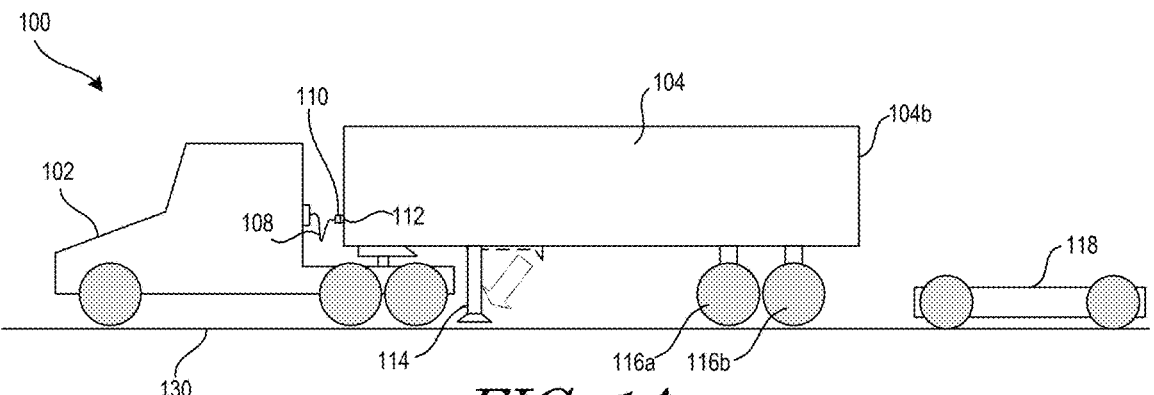
FIGS. 1A-1B illustrate parking of a trailer by an original truck and positioning of a rear trailer hostler, respectively, according to one or more embodiments of the disclosed subject matter.

Disclosed herein are rear trailer hostlers, and systems and methods for use thereof. The disclosed rear trailer hostlers can allow movement of a parked trailer without requiring the pneumatic brake of the trailer to be disengaged, for example, by supporting the fail-safe locked rear wheels of the trailer off the ground. In some embodiments, the rear trailer hostler can lift the trailer, for example, by contact with the trailer tires, the trailer axle, the trailer rear fender, or any combination thereof. Alternatively, in some embodiments, the trailer is parked atop the rear trailer hostler, for example, using one or more active or passive ramps. In some embodiments, the rear trailer hostler operates in cooperation with a front hostler to move the trailer, for example, by coupling a fifth wheel of the front hostler to the trailer. Alternatively, a dolly supporting the landing gear of the parked trailer can passively follow the rear trailer hostler as it moves the trailer with the pneumatic brakes of the trailer otherwise engaged. In some embodiments, the operation of the front hostler, the rear trailer hostler, or both can be autonomous or semi-autonomous (e.g., where the front hostler is manually driven and the rear trailer hostler actively follows the front hostler).

In some embodiments, the rear trailer hostler can also provide convenience features or safety features for loading/unloading the trailer. For example, the rear trailer hostler, or an actuatable part thereof, can act as a bridge between the trailer and a loading floor. In some embodiments, the bridge can adjust to conform to the height difference between the cargo bed of the trailer and a loading floor (e.g., floor of a loading dock). Opening the doors can be dangerous as loads within the trailer that have shifted in transit could impinge on the door and fall on the person as the door is opened. Since a person opening the doors of the trailer can stand on the bridge, and thus more closely to the level of the doors, the person can be a safer position when opening the trailer as compared to standing at ground level and below the level of the doors. Alternatively or additionally, the rear trailer hostler can include emergency door stops that can be automatically or manually deployed to arrest opening of the trailer doors, for example, when cargo incident on the doors results in rapid or violent opening that exceeds a safe threshold (e.g., an acceleration or velocity that exceeds a predetermined value).

II. Rear Trailer Hostler with Trailer Lift Unit

FIGS. 1A-1D illustrate exemplary operations for using a rear trailer hostler (RTH) to move a parked trailer without disengaging its pneumatic air brakes, for example, by lifting the locked wheels of the trailer off the ground. In some embodiments, a trailer 104 can initially be hitched to a truck 102 via a fifth-wheel 106 of the truck 102, for example, as shown in the initial stage 100 of FIG. 1A. During movement by the truck 102, the air brakes of the trailer 104 can be disengaged by pressurization of the pneumatic supply lines via air supply line 108. The air supply line 108 can have at its distal end a first gladhands coupler 110 (e.g., a male coupling component) that interfaces with a corresponding second gladhands coupler 112 (e.g., a female coupling component) to allow pressurized air from the truck 102 to reach the pneumatic supply lines of the trailer air brake.

Figure 1B:
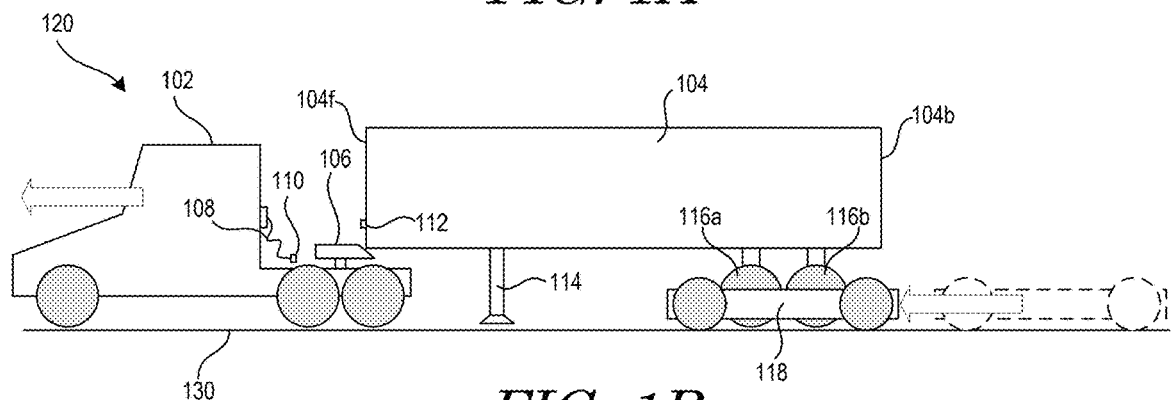
Figure 1C:
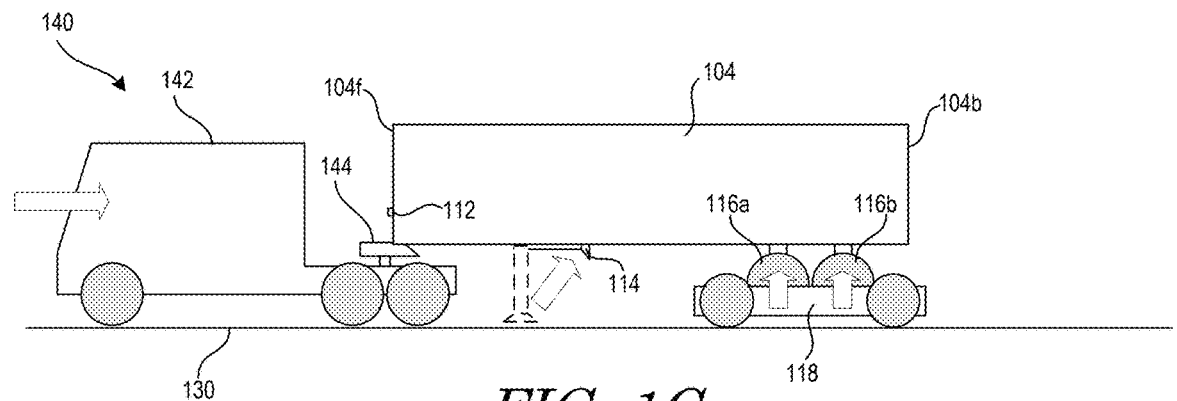
FIGS. 1C-1D illustrate coupling of a front hostler to the parked trailer and use of the front and rear trailer hostlers to move the trailer without disengaging its pneumatic brakes, respectively, according to one or more embodiments of the disclosed subject matter.

In some embodiments, the trailer 104 can be parked and disengaged from the truck 102, for example, as shown in FIG. 1B. For example, the landing gear 114 can be deployed, the fifth wheel 106 can be decoupled, and the truck 102 can be moved out from under the trailer 104. In addition, the first gladhands coupler 110 can be disengaged from the second gladhands coupler 112, thereby engaging the pneumatic brake of the trailer 104 and locking wheels 116a, 116b. Since the locked wheels 116a, 116b are in contact with the ground 130, the trailer 104 is otherwise prevented from moving. In some embodiments, during the positioning stage of FIG. 1B, RTH 118 can be positioned underneath the trailer 104, for example, with respect to the locked wheels 116a, 116b. The RTH 118 can include its own wheels and a trailer lift unit configured to vertically displace the trailer 104, or at least the wheels 116a, 116b thereof, to allow subsequent movement of the trailer 104 without disengaging the pneumatic brakes of the trailer 104. In other words, the trailer 104 can be moved despite locked wheels 116a, 116b by using the wheels of the RTH 118 instead.

In some embodiments, the RTH 118 can autonomously position itself with respect to the trailer 104, for example, by detecting a position and/or pose of the trailer 104 using one or more onboard sensors and by driving underneath or around a back end 104b of the trailer 104 to align therewith based on the detected position and/or pose. Alternatively or additionally, the RTH 118 can receive external input regarding position and/or pose of the trailer 104, for example, via one or more sensors in a loading yard detecting position and/or pose of the trailer 104 and/or position and/or pose of the RTH 118, via a central command system specifying a location of parked trailer to move, or both. Alternatively or additionally, a remote human user can teleoperate the RTH 118 to position it with respect to the trailer 104.

In some embodiments, the initial parking by truck 102 can position the back end 104b of the trailer 104 with respect to the RTH 118, such that minimal or no separate positioning by the RTH 118 is necessary. For example, the RTH 118 can be disposed at a back end of a predetermined parking space, and the truck 102 can reverse the trailer 104 into the parking space such that, prior to disengagement of the truck 102, wheels 116a, 116b of the trailer 104 are in an appropriate position with respect to the RTH 118 for subsequent lifting. Alternatively or additionally, the RTH 118 can be manually controlled to move, or be manually moved, into place underneath the trailer 104. For example, a driver of the truck 102, or a lot attendant overseeing or coordinating operations where the trailer 104 has been parked, can manually drive (e.g., through a user interface on the RTH 118 or a remote control separate from the RTH 118) the RTH 118 underneath the trailer 104 before or after disengaging the truck 102.

In some embodiments, in preparation for movement of the trailer 104, the RTH 118 can actuate a trailer lift unit (TLU) to vertically displace the locked wheels 116a, 116b of the trailer 104 off the ground 130. Once the wheels 116a, 116b of the trailer 104 have been lifted by the TLU of RTH 118, other vehicles can subsequently move the trailer 104 without having to connect their own pneumatic supply lines thereto and without otherwise having to disengage the pneumatic brakes of the trailer 104. For example, the parked trailer 104 can be coupled to another truck, such as a front hostler, for moving around a distribution center, marine terminal, rail head, parking lot, etc. As shown in transport stage 140 of FIG. 1C, a front hostler 142 can align with and back into the parked trailer 104 such that its fifth wheel 144 engages with the trailer 104. Alternatively, in some embodiments, instead of connecting to the trailer 104 directly, the front hostler can be coupled to a front end of the RTH 118. In such embodiments, the RTH 118 can extend sufficiently far forward so as to support the landing gear 114 thereon and/or to allow the front hostler to connect thereto (e.g., via fifth wheel 144 or any other coupling mechanism).

Figure 1D:
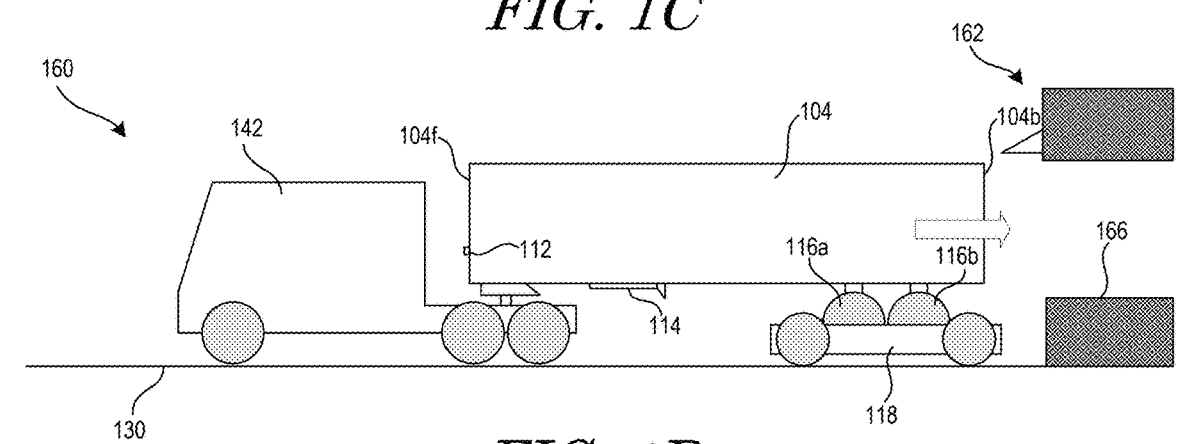

Once the front hostler 142 is engaged with the trailer 104, the landing gear 114 can optionally be retracted, and the trailer 104 can be moved by the combination of the front hostler 142 and the RTH 118, for example, to a loading dock 162, as shown in the docking stage 160 of FIG. 1D. In some embodiments, the front hostler 142 can send (e.g., via radio, ultra-wideband (UWB), Bluetooth, Wi-Fi, cellular, or any other wireless communication protocol) signals to the RTH 118, for example, to coordinate transport of the trailer 104. In some embodiments, RTH 118 actively operates during transport of the trailer 104 by the front hostler 142, for example, by adjusting drive and steering of the wheels of RTH 118 to follow the front hostler 142 (e.g., based on the signals received from the front hostler). Alternatively, in some embodiments, RTH 118 passively operates during transport of the trailer 104 by the front hostler 142, for example, where the wheels of the RTH 118 move independently based on the motion of the front hostler 142 and trailer 104 without any control by the RTH 118 (e.g., the RTH operating as a dolly for the trailer 104). Alternatively, in some embodiments, the RTH 118 can move the parked trailer 104 without using another hostler or vehicle coupled to the front end 104f of the trailer 104, for example, by providing a passive dolly or an active hostler underneath and supporting the landing gear 114.

Figure 2A:
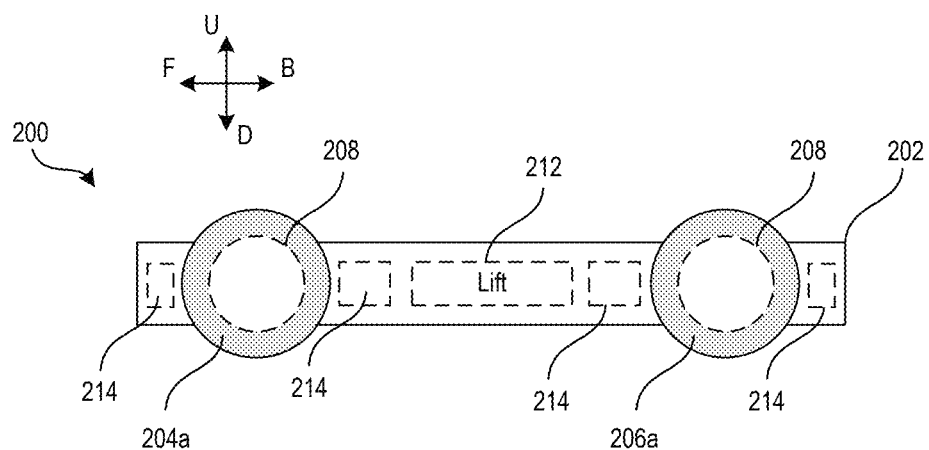
FIGS. 2A-2B are simplified side and plan view schematic diagrams of an exemplary rear trailer hostler employing a first configuration of a trailer lift unit, according to one or more embodiments of the disclosed subject matter.
Figure 2B:
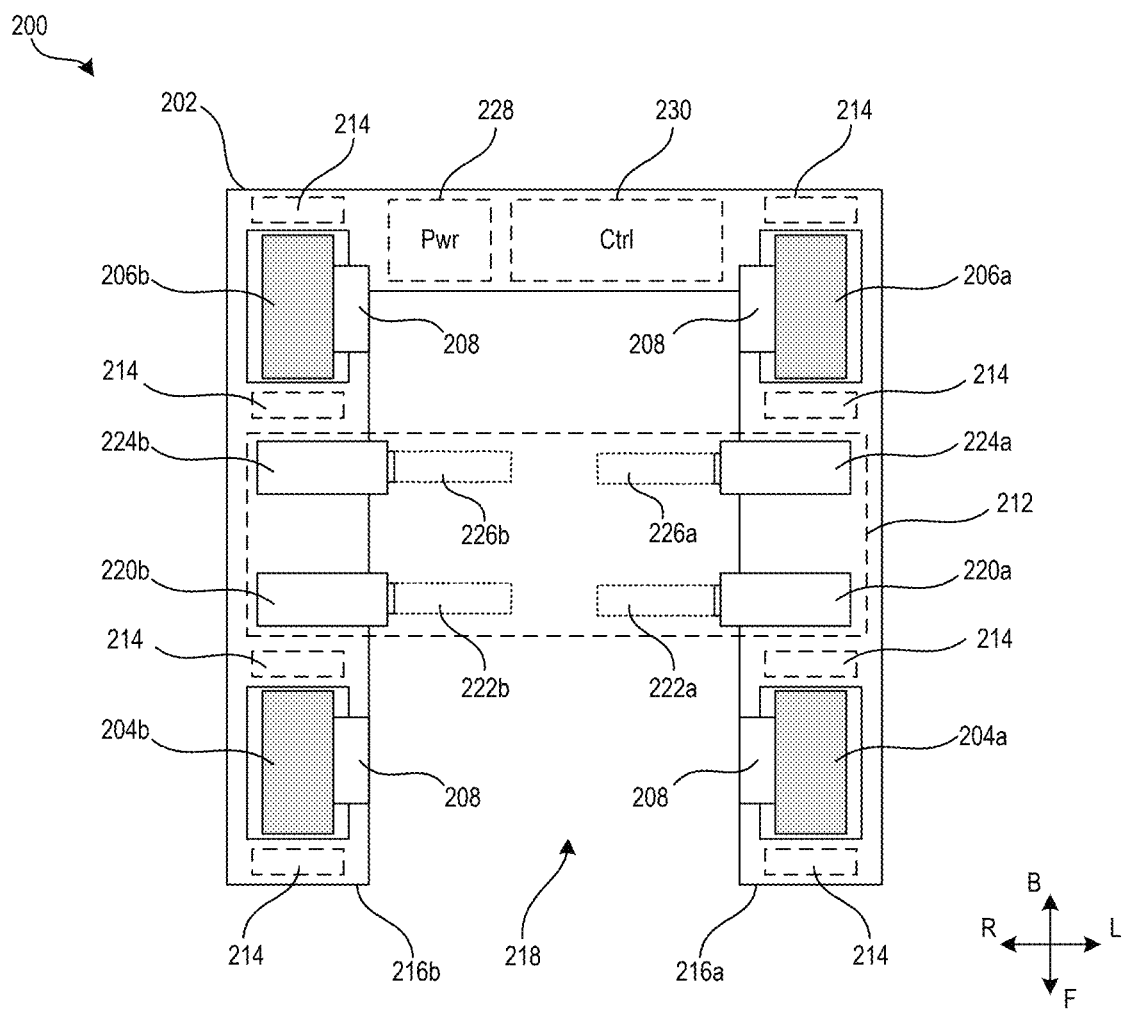

FIGS. 2A-2B show an exemplary configuration of an RTH 200 that can be used to lift and move (alone or in cooperation with a front hostler) a parked trailer. In the illustrated example, the RTH 200 has a substantially U-shaped vehicle chassis in plan view, with a left arm 216a and a right arm 216b extending longitudinally (e.g., along a horizontal direction from front (F) to back (B)) from a rear body 202 and disposed on opposite lateral (e.g., along a horizontal direction from left (L) to right (R)) sides of a central front access 218. In some embodiments, the central front access 218 can be sized and shaped to allow wheels of a trailer to be received between the left arm 216a and right arm 216b (e.g., with the arms disposed laterally outward and adjacent to the wheels of the trailer).

The RTH 200 can further include a TLU 212. In some embodiments, the TLU 212 can comprise one or more lifting mechanisms, which employ electric power, pneumatic power, hydraulic power, or any combination thereof, to raise (e.g., along a vertical direction from down (D) to up (U)) the trailer from an initial height where locked wheels of the trailer contact a ground to a second height where the locked wheels are held off the ground. In some embodiments, the lifting mechanisms of the TLU 212 can directly contact part of the trailer to lift the wheels off the ground, for example, one or more tires of the trailer, one or more axles of the trailer, an undercarriage of the trailer, a rear fender of the trailer, or any combination thereof. In the illustrated example, the TLU 212 includes a first pair of hydraulic rams 220a, 220b and a second pair of hydraulic rams 224a, 224b respectively disposed on or within left and rights arms 216a, 216b. Each of the hydraulic rams can have respective piston rods 222, 226 that move from an initial retracted state that does not infringe upon the open space of the central front access 218 (e.g., to allow the wheels of the trailer to be positioned therein) and a laterally extended state (dashed outlines) (e.g., for contacting the wheels of the trailer for lifting).

The hydraulic rams 220, 224 can be disposed to interact with opposite sides of respective tires of the trailer to lift the tire off the ground. For example, a left tire of the trailer can be situated between left front hydraulic ram 220a and left rear hydraulic ram 224a, and right tire of the trailer can be situated between right front hydraulic ram 220b and right rear hydraulic ram 224b. The piston rods 222a, 226a of the left hydraulic rams 220a, 224a can be inwardly extended to positions underneath the left tire, and the piston rods 222b, 226b of the right hydraulic rams 220b, 224b can be inwardly extended to positions underneath the right tire (e.g., similar to the arrangements illustrated in FIGS. 3A-3C). The TLU 212 can further include another lift mechanism (e.g., other hydraulic rams, platform elevators, etc.) that moves the respective hydraulic rams 220, 224 into contact and lifting the respective tire. Although FIGS. 2A-2B illustrate only two pairs of hydraulic rams, embodiments of the disclosed subject matter are not limited thereto. Rather, in some embodiments, the TLU 212 can include fewer or additional hydraulic rams. For example, each wheel of the trailer can be provided with its own pair of hydraulic rams.

Figure 2C:
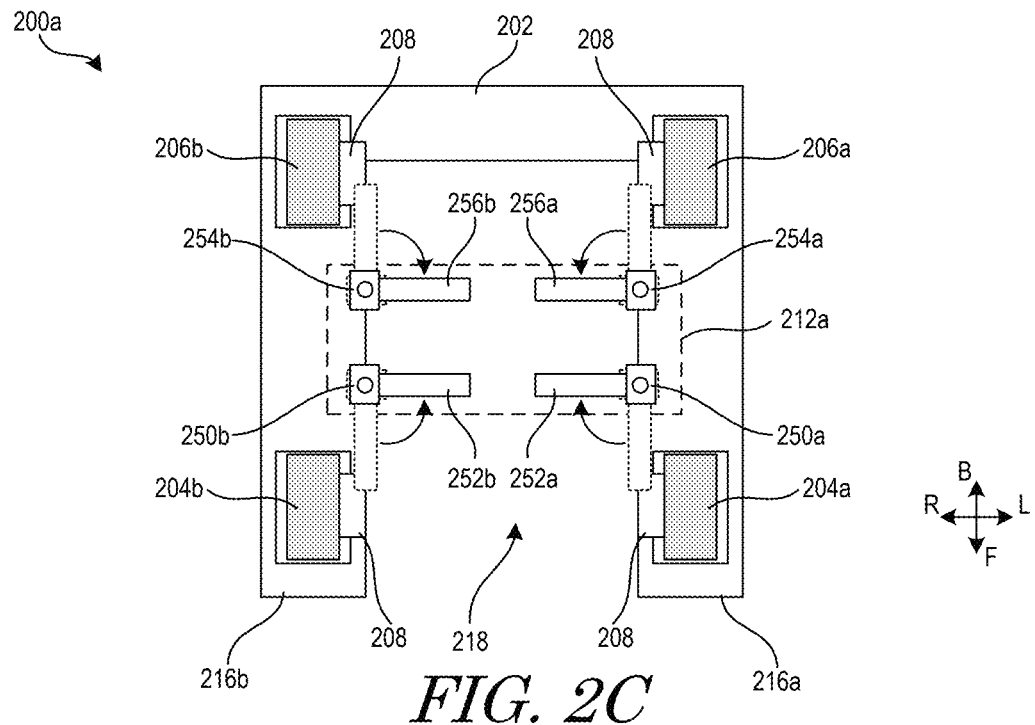
FIG. 2C is a simplified plan view schematic diagram of another exemplary rear trailer hostler employing a second configuration of a trailer lift unit, according to one or more embodiments of the disclosed subject matter.

In the illustrated example of FIGS. 2A-2B, the piston rods of the hydraulic rams extend laterally inward in order to engage with the trailer disposed within the central access 218. Alternatively, in some embodiments, the lifting mechanisms can be rotated in a horizontal plane in addition to or in place of lateral extension. For example, FIG. 2C shows another exemplary RTH 200a with TLU 212a employing a plurality of lifting mechanisms. In the illustrated example, the TLU 212a includes a first pair of support rods 252a, 252b and a second pair of support rods 256a, 256b respectively disposed on or within left and rights arms 216a, 216b. Each support rod 252, 256 is rotatably mounted to the RTH chassis via respective pivot actuators 250, 254, which allow the support rods to move from an initial state extending substantially along a longitudinal direction (dashed outlines) to a deployed state extending laterally inward. The support rods 252, 256 can thus be kept out of the way to allow the wheels of the trailer to be positioned within the central access 218, and then rotated into place for engaging with trailer for lifting.

In some embodiments, the RTH can further include one or more sensors configured to detect the trailer, characteristics of the trailer, or features in an environment surrounding the trailer. In the illustrated example of FIGS. 2A-2B, RTH 200 includes a plurality of sensors 214 within or supported on lateral arms 216a, 216b and rear body 202. Such sensors 214 can include, but are not limited to, a navigation unit, an inertial measurement unit, an odometer, a light detection and ranging (LIDAR) system, radio detection and ranging (RADAR) system, an infrared imager, an optical imager, a trailer weight sensor, or any combination thereof.

In the illustrated example of FIGS. 2A-2B, a controller 230 is mounted on or within the chassis of the RTH 200 (e.g., within rear body 202 in the illustrated example). The controller 230 can be used to control operation of the RTH 200. For example, the controller 230 can send control signals to propulsion unit(s) 208 to direct movement of the RTH 200 to align with the trailer or to follow a front hostler. Alternatively or additionally, the controller 230 can send controls signals to the lifting mechanisms of the TLU 212 to engage and lift the trailer, for example, by extending and/or moving piston rods 222, 226 of hydraulic rams 220, 224.

In the illustrated example, each arm 216 supports a respective front wheel 204 and a respective rear wheel 206. In some embodiments, additional wheels can be provided for each arm 216 and/or for rear body 202. In some embodiments, the wheels 204, 206 can comprise pneumatic tires. Alternatively, some or all of the wheels 204, 206 can comprise airless tires, for example, having a construction similar to that described in U.S. Pat. No. 10,421,319, entitled "Non-pneumatic tire with integrated polymeric flexible wheel center mount," which is incorporated by reference herein. Alternatively, some or all of the wheels 204, 26 can comprise substantially solid polymer tires (e.g., polyurethane).

In some embodiments, the wheels of the RTH can be independently driven or steered. For example, each wheel 204, 206 can have a respective propulsion unit 208 (e.g., electric motor). A power supply 228 (e.g., battery for electrical power or gas tank for an internal combustion engine) can be included for powering operation of the RTH 200 (e.g., propulsion unit 208 and/or controller 230). Alternatively or additionally, in some embodiments, some or all of the wheels can share a propulsion unit via a drivetrain or transmission. Alternatively or additionally, in some embodiments, only some of the wheels are driven (e.g., a front-wheel drive configuration where front wheels 204a, 204b provide both drive and steering, or a rear-wheel drive configuration where rear wheels 206a, 206b provide drive and front wheels 204a, 204b provide steering).

Figure 2D:
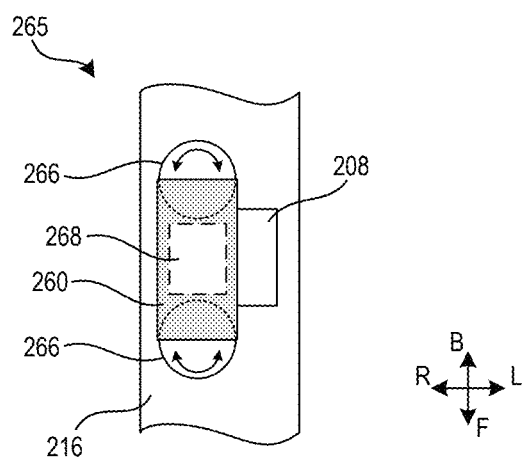
FIG. 2D is a simplified schematic diagram of an exemplary omnidirectional wheel configuration for use in a rear trailer hostler, according to one or more embodiments of the disclosed subject matter.

In some embodiments, some or all of the wheels 204, 206 can be omnidirectional so as to allow simultaneous or sequential movement of the RTH in two directions in a horizontal plane without requiring separate steering (e.g., without changing a direction of an axis of rotation of the wheel with respect to the RTH). For example, FIG. 2D illustrates an omnidirectional wheel configuration 265 employing a central wheel 260 that is driven about a first rotational axis (e.g., substantially parallel to the lateral L-R direction) by a first propulsion unit 208 (e.g., electric drive) to move the lateral arm 216 of the RTH along the longitudinal direction (e.g., substantially parallel to the F-B direction). In the illustrated example, the omnidirectional wheel configuration 265 further includes a plurality of lateral rollers 266 disposed around a circumference of the central wheel 260 that are drive about a second rotational axis (e.g., in a plane substantially perpendicular to the page) by a second propulsion unit 268 (e.g., electric drive) to move the lateral arm 216 of the RTH along the lateral direction (e.g., substantially parallel to the L-R direction).

Other omnidirectional wheel configurations and/or drive mechanisms are also possible according to one or more contemplated embodiments. For example, one, some, or all of the wheels of an RTH can employ one or more of the omnidirectional configurations disclosed in U.S. Pat. No. 9,770,943 entitled "Omnidirectional wheel," U.S. Pat. No. 10,675,912 entitled "Moveable carrier and omnidirectional wheel thereof," U.S. Pat. No. 9,573,416 entitled "Wheel assembly with multi-sphere omniwheels and omnidirectional devices including the wheel assembly," or U.S. Pat. No. 9,580,002 entitled "Omnidirectional vehicle transport," all of which are hereby incorporated herein by reference.

Figure 2E:
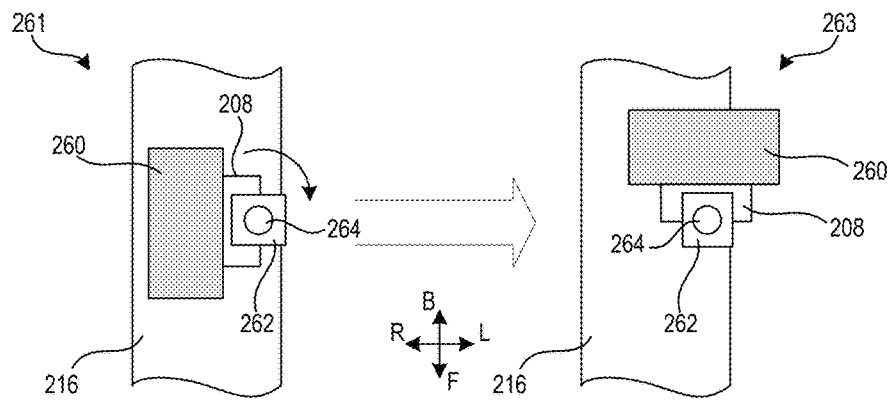
FIG. 2E is a simplified schematic diagram of an exemplary drive configuration for independent steering control of wheels in a rear trailer hostler, according to one or more embodiments of the disclosed subject matter.

In some embodiments, some or all of the wheels 204, 206 can be independently steered (e.g., to change a direction of an axis of rotation of the wheel with respect to the RTH). For example, FIG. 2E illustrates a steering configuration employing a wheel 260 and propulsion unit 208 rotatably mounted to lateral arm 216 of an RTH. In the forward-reverse orientation 261, an actuator 262 positions the wheel 260 about pivot point 264 such that an axis of rotation of the wheel is substantially parallel to the lateral L-R direction, thereby allowing rotation of the wheel 260 to move the lateral arm 216 along the longitudinal direction (e.g., substantially parallel to the F-B direction). In the left-right orientation 263, actuator 262 rotates the assembly about pivot point 264 such that the axis of rotation of the wheel 260 is substantially parallel to the longitudinal F-B direction, thereby allowing rotation of the wheel to move the lateral arm 216 along the lateral direction (e.g., substantially parallel to the L-R direction). Although only two orientations 261, 263 are show in FIG. 2E, the steering configuration can be capable of any orientation within 360° of rotation about pivot point 264. Alternatively, in some embodiments, the steering between lateral pairs of wheels (e.g., front wheels 204a, 204b or rears wheels 206a, 206b) can be coupled together via linkages (not shown), for example, employing an Ackermann steering geometry.

Figure 2F:
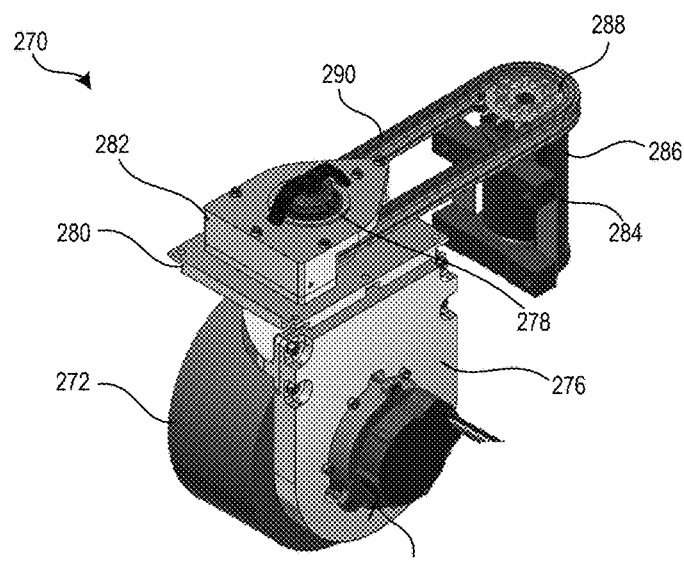
FIGS. 2F-2G are perspective views of another exemplary drive configuration for independent steering control of wheels in a rear trailer hostler, according to one or more embodiments of the disclosed subject matter.
Figure 2G:
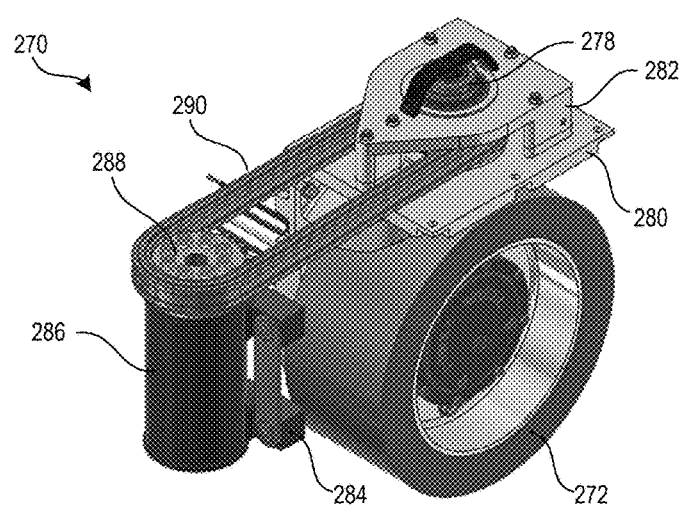

FIGS. 2F-2G illustrate an exemplary wheel configuration 270 for independent steering and driving. Similar to the configuration of FIG. 2E, the configuration 270 of FIGS. 2F-2G employs a wheel (e.g., tire 272) and propulsion unit (e.g., electric motor 274) that can be rotatably supported on the RTH (e.g., via wheel mount 276 and chassis mount 280). The wheel mount 276 (also referred to as an upright bracket) can have a steering shaft that extends vertically upward away from the tire 272, through an opening in the chassis mount 280, and into a bearing 278 supporting by bracket 282. The chassis mount 280 can be coupled to the RTH (e.g., lateral arm 216) to retain the wheel assembly, while rotation of the steering shaft within bearing 278 can cause corresponding rotation of the wheel mount 276 (and the tire 272 mounted thereon) with respect to the RTH. A steering drive (e.g., hydraulic drive 286) can be mounted to the RTH (e.g., lateral arm 216) via a separate mount bracket 284. Actuation of the hydraulic drive 286 can change an orientation of wheel mount 276 by rotating the steering shaft in bearing 278 via drive gear 288 and drive belt 290.

III. Lifting Configurations for Rear Trailer Hostler

Figure 3A:
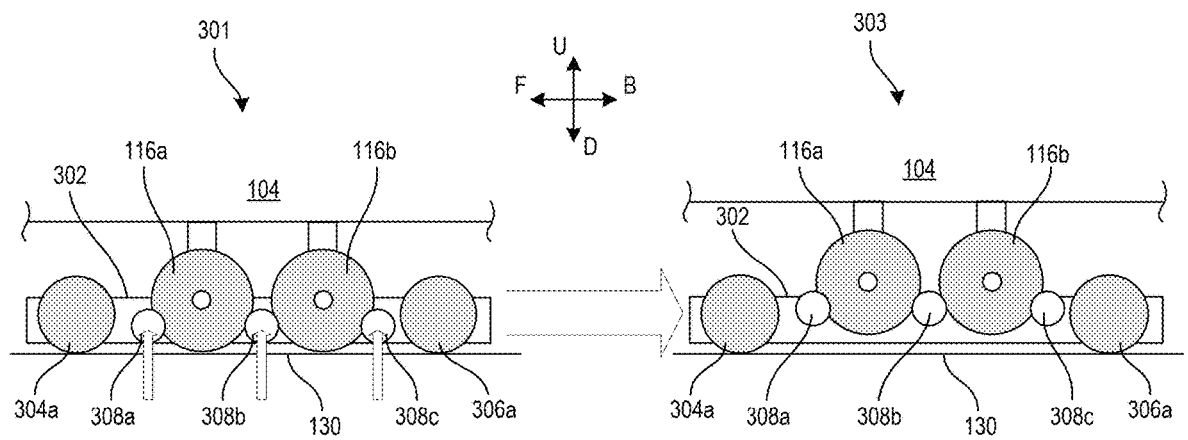
FIGS. 3A-3D illustrates exemplary trailer-tire lifting mechanisms that can be employed in a rear trailer hostler, according to one or more embodiments of the disclosed subject matter.

In some embodiments, the lifting mechanisms of the rear trailer hostler (RTH) contact and displace the wheels of the trailer. Even though trailer structure can vary greatly between different trailers, all trailers otherwise carry their weight on their wheels. Thus, the RTH can be widely applicable to a wide variety of trailers with little or no customization by focusing the lifting mechanisms on displacing the wheels. For example, FIG. 3A illustrates an exemplary configuration for lifting of wheels of a parked trailer 104 using RTH 302. In the initial lowered state 301, the locked wheels 116a, 116b of the trailer 104 are in contact with the ground 130, such that the trailer 104 would be incapable of movement without disengaging pneumatic brakes of the trailer. The RTH 302 is positioned underneath the trailer 104 such that lifting rods 308a-c (e.g., piston rods of hydraulic rams after inward lateral extension) are positioned with respect to the trailer wheels, for example, with each wheel being bordered by a respective pair of the lifting rods. The lifting rods 308a-c can then be displaced vertically upwards to lift the trailer 104 while cradling the wheels 116a, 116b, as shown in the raised state 303. Using the wheels 304a, 306a of the RTH 302, the trailer 104 can thus be moved even though wheels 116a, 116b thereof remain locked.

In the illustrated example of FIG. 3A, wheels 116a, 116b share a central lifting rod 308b, which may be a different size than the other lifting rods 308a, 308c to accommodate the spacing between the trailer wheels 116a, 116b (e.g., to allow lifting rod 308b to contact both wheels at the same time). Alternatively, in some embodiments, additional lifting rods can be provided such that each wheel 116a, 116b has its own respective pair of lifting rods, for example, where central lifting rod 308b is replaced with separate forward and aft lifting rods.

Figure 3B:
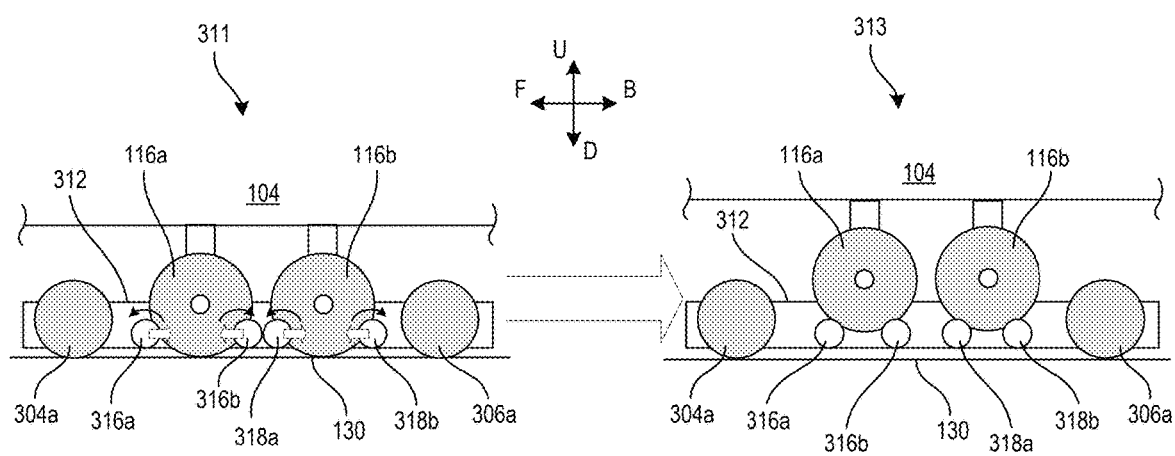

In the illustrated example of FIG. 3A, the lifting rods 308a-c are constructed to move vertically to raise the wheels 116a, 116b off the ground 130. Alternatively or additionally, in some embodiments, the lifting rods can move horizontally (e.g., toward the wheels) in order to raise the wheels 116a, 116b off the ground. For example, FIG. 3B illustrates another exemplary configuration for lifting of wheels of a parked trailer 104 using RTH 312. In the initial lowered state 311, the RTH 312 is positioned underneath the trailer 104 such that lifting rods 316a-b, 318a-b (e.g., piston rods of hydraulic rams after inward lateral extension) are positioned with respect to the trailer wheels, for example, with the first pair of lifting rods 316a-b on opposite sides of the first wheel 116a and the second pair of lifting rods 318a-b on opposite sides of the second wheel 116b. To raise the trailer wheels, each lifting rod in the pair can move toward the other lifting rod in the pair (e.g., rod 316a toward rod 316b, and rod 318a toward rod 318b), thereby compressing a lower portion of the corresponding wheel therebetween. The lifting rods 316a-b, 318a-b can be configured to passively rotate about a lateral axis, such that, as the rods move inward toward a center of the corresponding wheel 116, the wheel is lifted off the ground, as shown in the raised state 313. Using the wheels 304a, 306a of the RTH 312, the trailer 104 can thus be moved even though wheels 116a, 116b thereof remain locked.

Figure 3C:
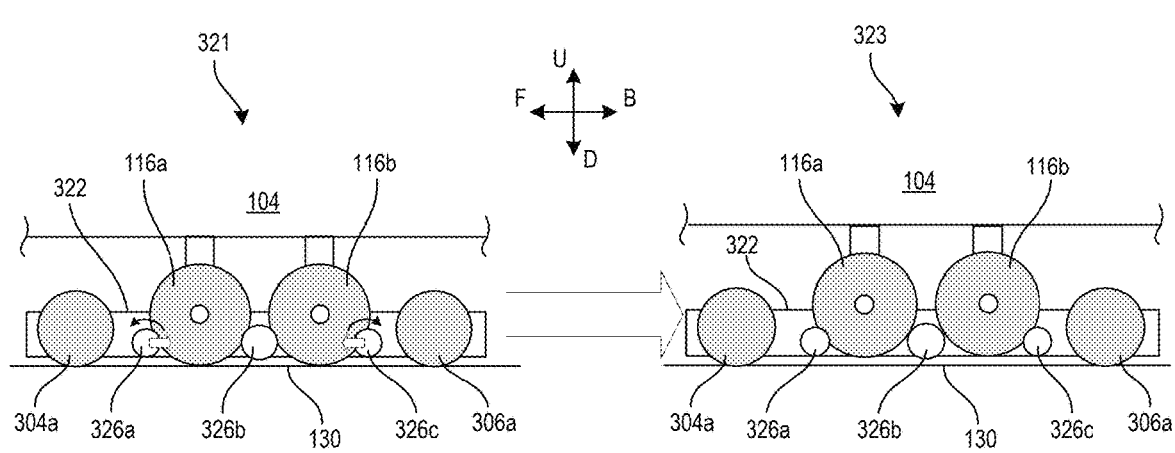

In the illustrated example of FIG. 3B, each wheel 116a, 116b has its own respective pair of lifting rods. Alternatively, in some embodiments, wheels 116a, 116b can share a central lifting rod, for example, where lifting rod 316b of the front pair and lifting rod 318a of the back pair are replaced by a single lifting rod. For example, FIG. 3C illustrates another exemplary configuration for lifting of wheels of a parked trailer 104 using RTH 322. In the initial lowered state 321, the RTH 322 is positioned underneath the trailer such that lifting rods 326a-c (e.g., piston rods of hydraulic rams after inward lateral extension) are positioned with respect to the trailer wheels, for example, with first lifting rod 326a and second lifting rod 326b on opposite sides of the first wheel 116a, and second lifting rod 326b and third lifting rod 326c on opposite sides of the second wheel 116b. In some embodiments, the second lifting rod 326b may be a different size than the other lifting rods 326a, 326c to accommodate the spacing between the trailer wheels 116a, 116b (e.g., to allow lifting rod 326b to contact both wheels at the same time). To raise the trailer wheels, the first lifting rod 326a and the third lifting rod 326c can be moved longitudinally toward the second lifting rod 326b, thereby compressing a lower portion of the corresponding wheel therebetween. In some embodiments, the first and third lifting rods 326a, 326c can be configured to passively rotate about a lateral axis, while the second lifting rod 326b remains substantially static (e.g., without longitudinal displacement or rotation). As the lifting rods 326a, 326c move toward the second lifting rod 326b, the corresponding wheel 116 can be lifted off the ground, as shown in the raised state 323. Using the wheels 304a, 306a of the RTH 322, the trailer 104 can thus be moved even though wheels 116a, 116b thereof remain locked.

Figure 3D:
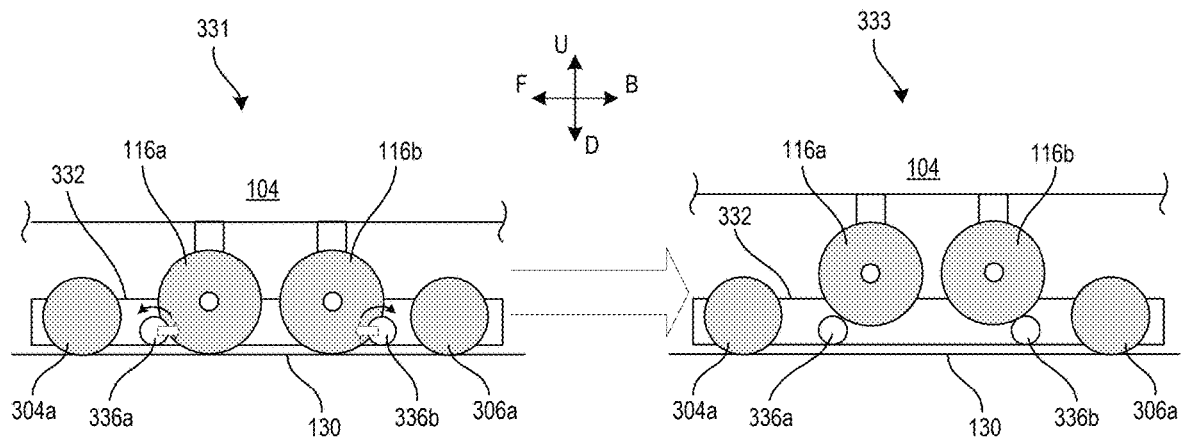

In the illustrated example of FIG. 3C, wheels 116a, 116b share a central lifting rod 326b. Alternatively, in some embodiments, fewer lifting rods can be provided, for example, by eliminating the central lifting rod and instead using a single pair of lifting rods for both wheels. For example, FIG. 3D illustrates another exemplary configuration for lifting of wheels of a parked trailer 104 using RTH 332. In the initial lowered state 331, the RTH 332 is positioned underneath the trailer such that lifting rods 336a-b (e.g., piston rods of hydraulic rams after inward lateral extension) are positioned with respect to both trailer wheels, for example, with first lifting rod 336a at a front side of the first wheel 116a, and second lifting rod 336b at a rear side of the second wheel 116b. To raise the trailer wheels, the lifting rods 336a-b can be moved longitudinally toward each other into contact with the respective wheels 116a, 116b. Each of the lifting rods 336a-b can passively rotate about a lateral axis so as to allow the wheels to be lifted off the ground, as shown in the raised state 343. Using the wheels 304a, 306a of the RTH 332, the trailer 104 can thus be moved even though wheels 116a, 116b thereof remain locked.

Figure 3E:
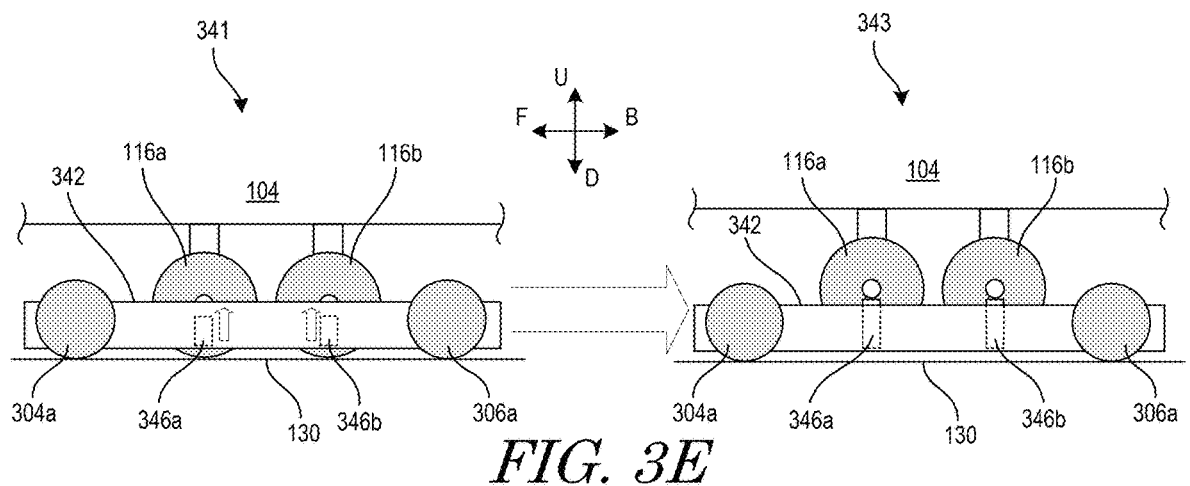
FIG. 3E illustrates an exemplary trailer-axle lifting mechanism that can be employed in a rear trailer hostler, according to one or more embodiments of the disclosed subject matter.

In the illustrated examples of FIGS. 3A-3D, the lifting rods contact and move the wheels of the trailer to raise the wheels off of the ground. Alternatively or additionally, in some embodiments, the RTH can contact or interact with other parts of the trailer in order to raise the wheels off the ground. For example, FIG. 3E illustrates another exemplary configuration for lifting of wheels of a parked trailer 104 using RTH 342. In the initial lowered state 341, the RTH 332 is positioned underneath the trailer such that vertical lifting units 346a, 346b (e.g., hydraulic rams) are positioned with respect to axles of the trailer wheels 116a, 116b, for example, with first lifting unit 346a aligned with the front axle of trailer wheel 116a, and second lifting unit 346b aligned with the rear axle of trailer wheel 116b. The lifting units 346a, 346b can then extend vertically upwards to lift the trailer 104 via contact with the axles, as shown in the raised state 343. Using the wheels 304a, 306a of the RTH 342, the trailer 104 can thus be moved even though wheels 116a, 116b thereof remain locked.

Figure 3F:
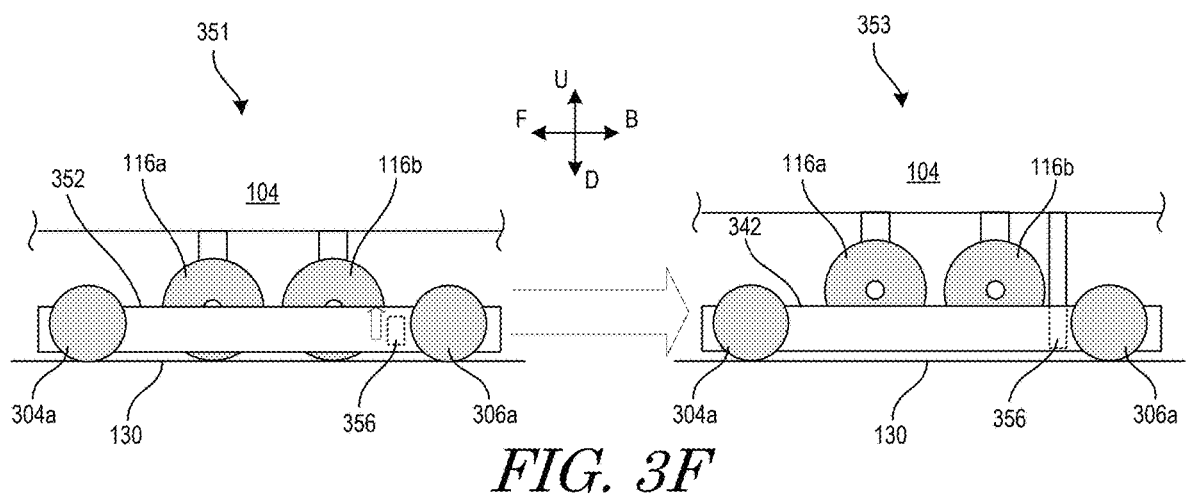
FIG. 3F illustrates an exemplary trailer-fender lifting mechanism that can be employed in a rear trailer hostler, according to one or more embodiments of the disclosed subject matter.

In yet another example, a FIG. 3F illustrates another exemplary configuration for lifting of wheels of a parked trailer 104 using RTH 352. In the initial lowered state 351, the RTH 352 is positioned underneath the trailer such that vertical lifting unit 356 (e.g., hydraulic ram) is positioned with respect a portion of the trailer undercarriage, for example, a rear fender of the trailer. The lifting unit 356 can then extend vertically upwards to lift the trailer 104 via contact with the undercarriage, as shown in the raised state 353. Using the wheels 304a, 306a of the RTH 352, the trailer 104 can thus be moved even though wheels 116a, 116b thereof remain locked.

Although the discussion above with respect to FIGS. 3A-3F have referred to specific lifting mechanisms (e.g., lifting rods in FIGS. 3A-3D and lifting units in FIGS. 3E-3F), other lifting mechanisms can be used to same effect according to one or more contemplated embodiments.

IV. Positioning of Rear Trailer Hostler

Figure 4A:
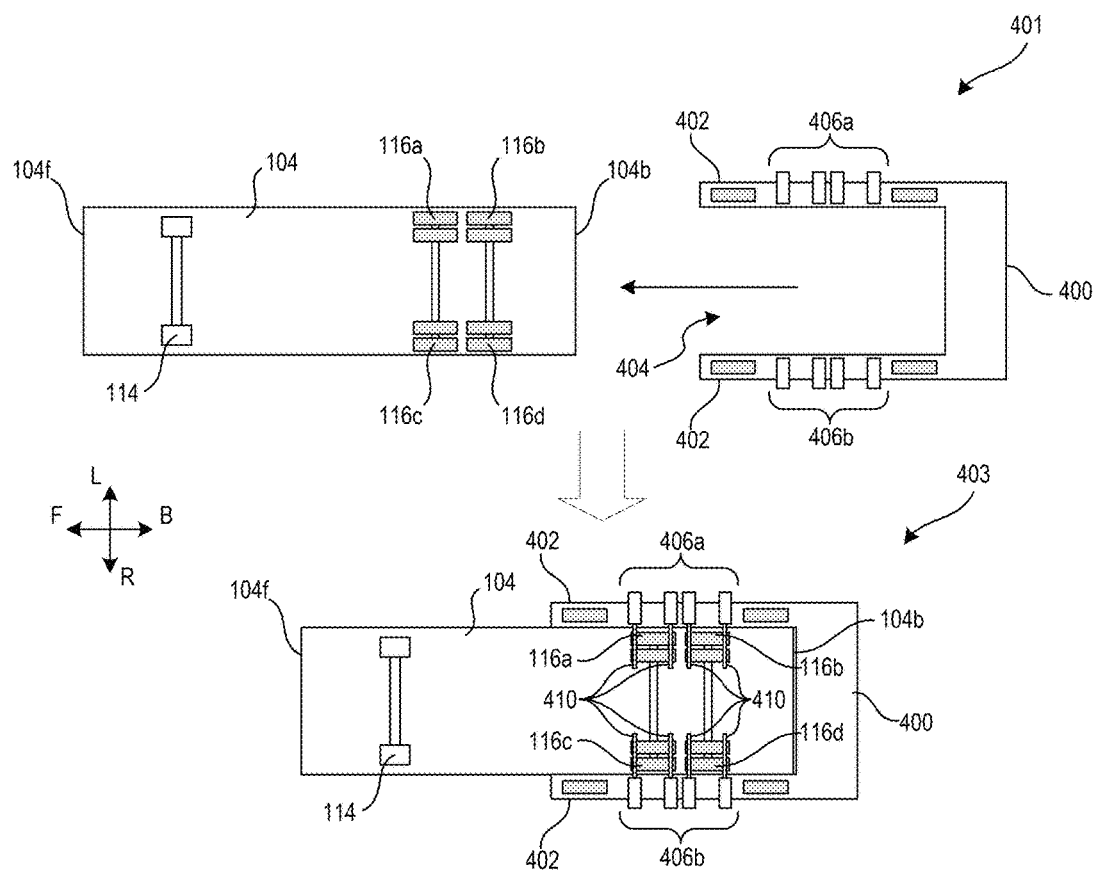
FIG. 4A illustrates an exemplary configuration and operation of a rear trailer hostler that accesses the trailer from the rear, according to one or more embodiments of the disclosed subject matter.

In some embodiments, with the landing gear deployed to support the front end of the trailer while the trailer is parked, a rear trailer hostler (RTH) can position itself by driving under the trailer via a back end or side access. For example, FIG. 4A illustrates an exemplary configuration and operation of RTH 400 for positioning with respect to the parked trailer 104 via back end 104*b* access, as shown at positioning stage 401. Similar to above described examples, the RTH 400 of FIG. 4A has a substantially U-shaped chassis with a pair of longitudinally-extending arms 402 on opposite sides of a central access 404. Each arm 402 can include a respective trailer lift unit (TLU) 406*a*, 406*b*, for example, including a plurality of lifting mechanisms (e.g., hydraulic rams). The size of the central access 404 can be designed to accommodate a width (e.g., along the L-R direction) of the trailer 104, or at least a width of axles of the wheels 116*a-d*, as the RTH 400 is moved into place underneath the back end 104*b* of the trailer 104. For example, once the RTH 400 is in place under the trailer 104, the arms 402 can be located laterally outward of and adjacent to the wheels 116*a-d*, as shown at lifting stage 403. Lifting rods 410 can then be laterally extended inward from the TLU 406*a*, 406*b* to contact and lift the wheels 116*a-d* of the trailer 104.

Figure 4B:
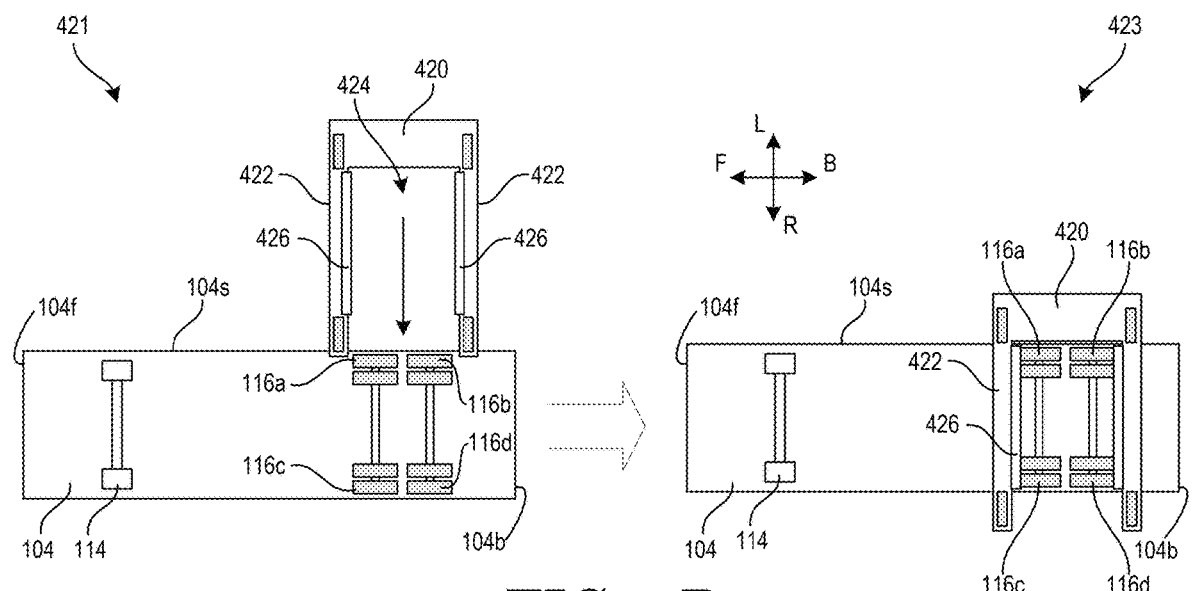
FIG. 4B illustrates an exemplary configuration and operation of a rear trailer hostler that accesses the trailer from the side, according to one or more embodiments of the disclosed subject matter.

Alternatively, FIG. 4B illustrates an exemplary configuration and operation of RTH 420 for positioning with respect to the parked trailer 104 via side 104*s* access, as shown at positioning stage 421. Similar to above described examples, the RTH 420 of FIG. 4B has a substantially U-shaped chassis with a pair of longitudinally-extending arms 422 on opposite sides of a central access 424. Each arm 422 can include a respective TLU 426, for example, including one or more longitudinally-extending lifting mechanisms (e.g., hydraulic rams). The size of the central access 424 can be designed to accommodate a longitudinal extent of the wheels 116*a*-116*d* (e.g., along the F-B direction), as the RTH 420 is moved into place underneath the trailer 104. For example, once the RTH 420 is in place under the trailer 104, one of the arms 422 can be located forward of the front wheels 116*a*, 116*c* and the other of the arms 422 can be located behind the rear wheels 116*b*, 116*d*, as shown at lifting stage 423. The lifting mechanisms of the TLUs 426 can move longitudinally toward the wheels 116*a-d* to contact and lift the wheels 116*a-d* of the trailer 104. In some embodiments, the RTH 420 employs wheels that are omnidirectional and/or reorients the wheels to allow the trailer 104 to be moved forward or backward (e.g., along the F-B direction) despite the initial side access orientation of the RTH 420.

Figure 4C:
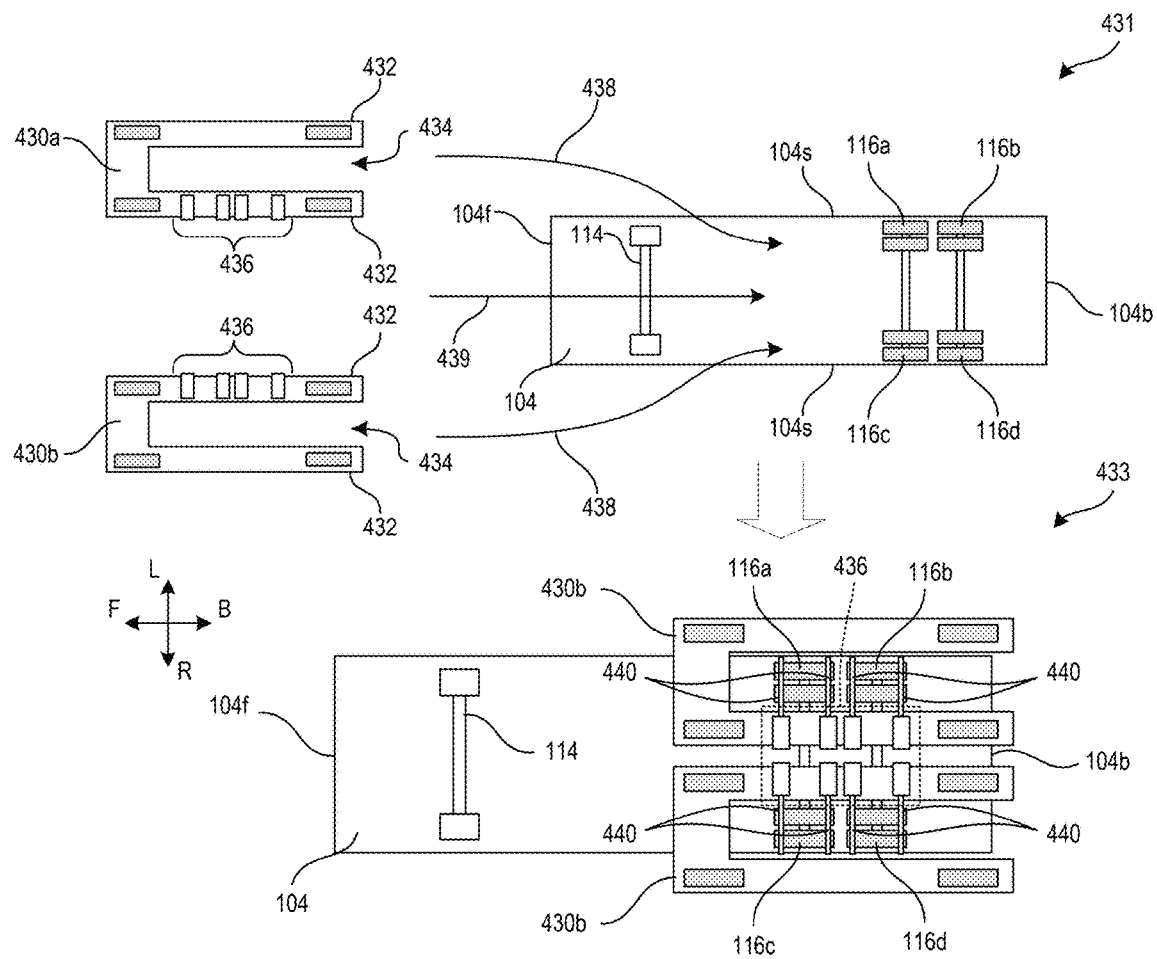
FIG. 4C illustrates an exemplary configuration and operation of multiple rear trailer hostlers that access the trailer from the front, according to one or more embodiments of the disclosed subject matter.

In some embodiments, multiple RTHs can be used to move a single trailer, for example, with each RTH supporting wheels on one side of the parked trailer. In such embodiments, each RTH can be narrower, thereby allowing the RTH to access from the front end of trailer. The ability to access from the front end of the trailer can enable adjacent trailers to be parked back-to-back with minimal space therebetween, for example, for efficient use of parking real estate. For example, FIG. 4C illustrates an exemplary configuration and operation of a pair of RTHs 430*a-b*, for positioning with respect to the parked trailer 104 via front end 104*f* access, as shown at positioning stage 431. Similar to above described examples, each RTH 430*a-b* of FIG. 4C has a substantially U-shaped chassis with a pair of longitudinally-extending arms 432 on opposite sides of a central access 434. One or both of the arms 432 can include a respective TLU 436, for example, including a plurality of lifting mechanisms (e.g., hydraulic rams). The size of the central access 434 of the left RTH 430*a* can be designed to accommodate a width (e.g., along the L-R direction) of wheels 116*a-b* on a left side of the trailer, and the size of the central access 434 of the right RTH 430*b* can be designed to accommodate a width of wheels 116*c*-116*d* on a right side of the trailer.

In some embodiments, each RTH 430*a-b* is sufficiently small to fit underneath the deployed landing gear 114, such that the RTHs 430*a-b* can be sequentially positioned with respect to the corresponding wheels 116*a-d* via front access path 439. Alternatively, in some embodiments, the RTHs 430*a-b* can be positioned, sequentially or simultaneously, with respect to the corresponding wheels 116*a-d* via front side access paths 438 that avoid the deployed landing gear 114. Once the RTHs 430*a-b* are in place under the trailer 104, the arms 432 of the left RTH 430*a* can be located laterally outward of and adjacent to wheels 116*a-b* and the arms 432 of the right RTH 430*b* can be located laterally outward of and adjacent to wheels 116*c*-116*d*, as shown at lifting stage 433. Lifting rods 440 can then be laterally extended inward from the TLUs 436 to contact and lift the wheels 116*a-d* of the trailer 104.

V. Rear Trailer Hostler with Platform

Figure 5A:
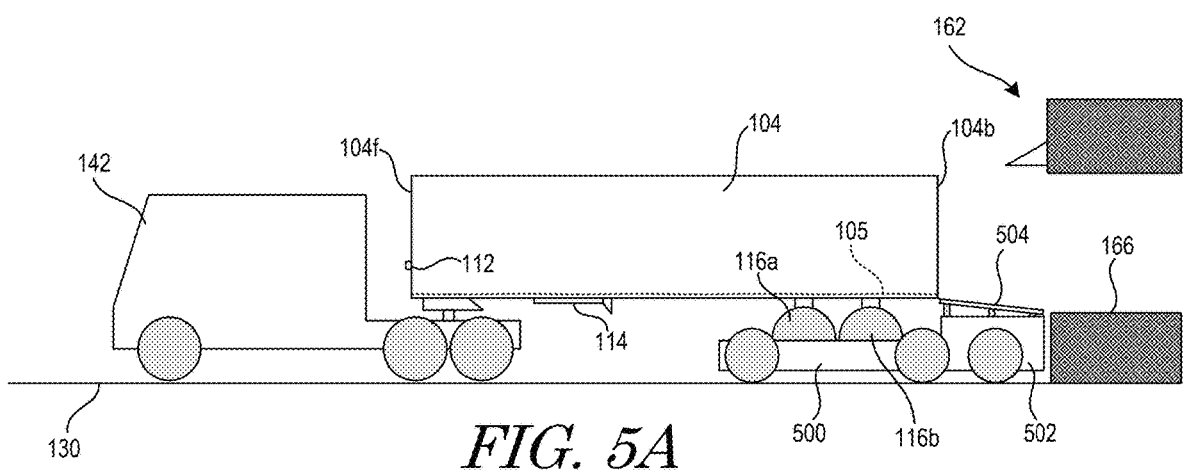
FIG. 5A illustrates an exemplary configuration and operation of a rear trailer hostler with platform to serve as a bridge between cargo floor of the trailer and loading floor, according to one or more embodiments of the disclosed subject matter.
Figure 5B:
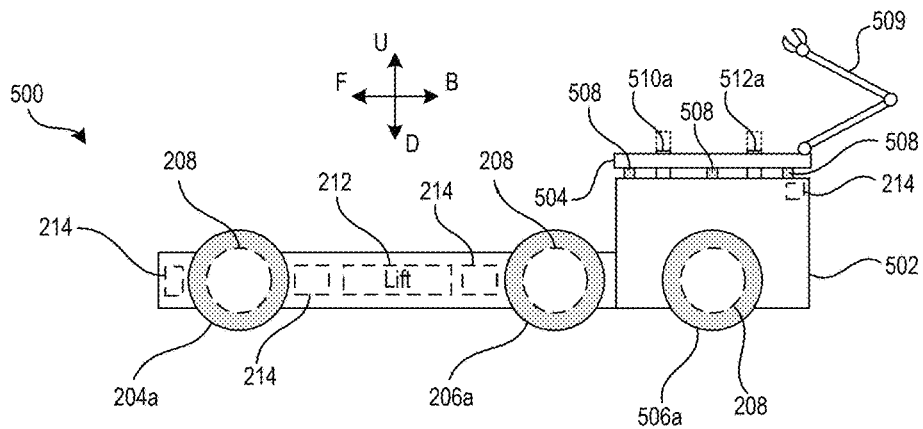
FIGS. 5B-5C are simplified side and plan view schematic diagrams of an exemplary rear trailer hostler with actuatable platform, according to one or more embodiments of the disclosed subject matter.
Figure 5C:
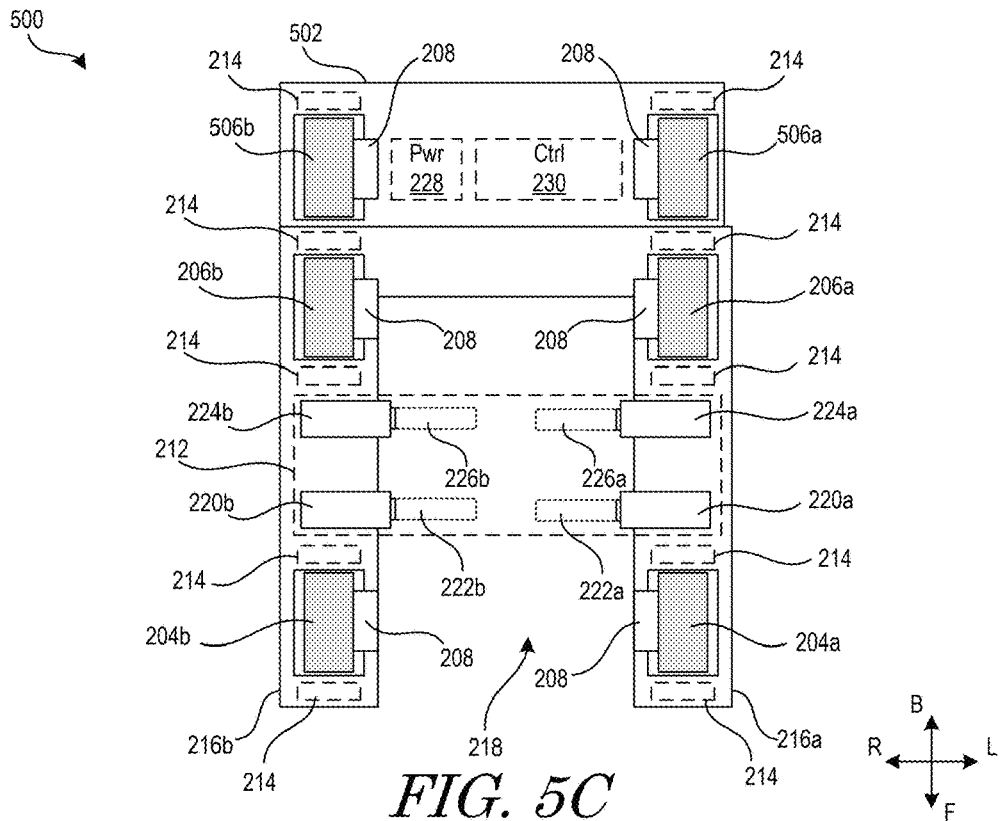

The height of a cargo bed of a trailer can vary depending on the load carried, for example, with heavier loads resulting in a lower cargo bed than lighter loads. In addition, heights of loading docks that interface with a trailer for loading or unloading thereof can vary between loading docks and may be different than that of the trailer cargo bed. Such variations in height can create challenges for efficient and safe forklift operation. Accordingly, in some embodiments, a rear trailer hostler (RTH) can include a platform that acts as a bridge between the cargo bed of the trailer and the floor of the loading dock. For example, FIGS. 5A-5C illustrate RTH 500 with an extended rear body 502, which can be disposed adjacent to a back end 104*b* of the trailer 104. The extended rear body 502 can include support wheels 506*a-b* (e.g., driven by respective propulsion units 208, similar to wheels 204, 206) and a platform 504 to act as the bridge between the cargo bed 105 of the trailer 104 and the dock floor 166. For example, the platform 504 can be wide enough (e.g., along a horizontal direction) to allow doors of the trailer 104 to swing fully open from the back end 104*b* of the trailer. In some embodiments, the platform 504 can include additional safety or protective features, such as, but not limited to, handrails, roofing (e.g., to protect from environmental elements), safety door stops 510, 512 (e.g., to restrain undesired motion of the trailer doors), manipulator arm 509 (e.g., to assist in opening the trailer doors and/or loading of cargo to/from the trailer), or any combination of the foregoing.

In some embodiments, the platform 504 can be adjustable to match the height of the trailer bed at its front end and the height of the dock at its rear end, for example, using one or more actuators 508 (e.g., electric actuators, pneumatic actuators, and/or hydraulic actuators, such as scissor actuator or other type of elevation mechanism) within or mounted to the rear body 502. In some embodiments, the platform is configured to allow adjustment of only a single end (e.g., the docking side, remote from the back end 104*b* of the trailer). Alternatively, in some embodiments, the platform is configured to allow adjustment of both ends (e.g., the trailer side and the docking side). In some embodiments, the RTH can be configured to detect heights of the cargo bed 105 and the dock floor 166, and can automatically adjust the platform 504 to match. Alternatively or additionally, the platform 504 can be manually adjusted, for example, by a dock worker or operator via controls on the platform 504 or remote control.

Figure 5D:
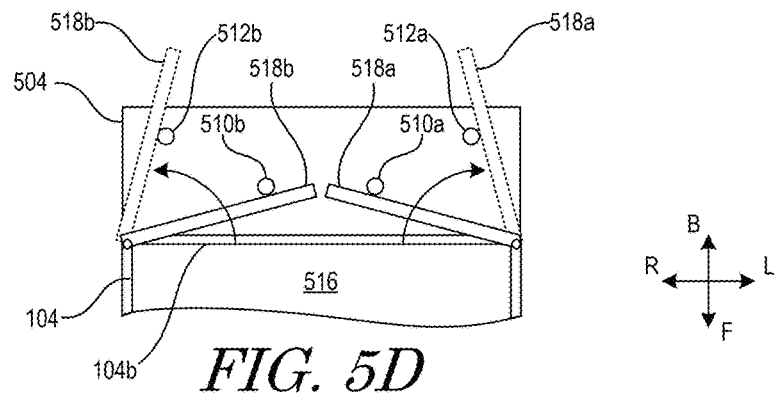
FIG. 5D illustrates an exemplary configuration and operation of a rear trailer hostler with safety door stops, according to one or more embodiments of the disclosed subject matter.

Opening the trailer doors can be dangerous as loads that shifted in travel can fall on the person opening the doors. Accordingly, in some embodiments, the platform of the RTH can include extendable door stops (e.g., on the floor or a side of the platform) that can be used to stop the trailer doors from opening too quickly (e.g., due to loads impacting the door). For example, FIG. 5D illustrates an exemplary setup with platform 504 of an RTH including a pair of forward door stops 510*a-b* that prevent further opening of trailer doors 518*a-b*, for example, due to loads from the cargo volume 516 impinging on the doors. In some embodiments, the extendable doors stops 510*a-b* can deploy automatically (e.g., by extending vertically out of platform 504) in response to one or more sensors (e.g., cameras, LIDAR, RADAR, and/or acoustic sensors of the RTH and/or at the loading dock 162) detecting that opening of the trailer doors is too fast (e.g., when a detected velocity, acceleration, or both of the door exceeds a predetermined value) or the operator decides it is unsafe. Alternatively or additionally, in some embodiments, the extendable door stop can be deployed manually. For example, the stops 510*a-b* can be manually extended, and the trailer doors 518*a-b* opened slightly. If an operator perceives that the situation is safe, then the stops 510*a-b* can be manually retracted and the doors 518*a-b* fully opened. The same door stops 510*a-b*, or an additional set of rear door stops 512*a-b*, can be used to hold the doors open while the process of loading/unloading is performed, for example, to avoid accidental closure due to wind or other forces.

VI. Rear Trailer Hostler with Integrated Ramps

FIGS. 6A-6D illustrate exemplary operations for using a rear trailer hostler (RTH) to move a parked trailer without disengaging its pneumatic air brakes, for example, by directly parking the trailer atop the RTH. For example, as shown in the positioning stage of FIG. 6A, an RTH 602 can include a pair of ramps 606*a*, 606*b* extending between a level of the ground 130 and an upper support surface 604. The truck 102, which is coupled to the trailer 104 via fifth-wheel 106 and air supply line 108, can drive over the support surface 604 via the ramps (e.g., up the rear ramp 606*b* and down the front ramp 606*a* in the illustrated example) in order to park the trailer 104 atop the RTH 602. For example, as shown in the parking stage 620 of FIG. 6B, the trailer 104 can be disengaged from the truck 102. For example, the landing gear 114 can be deployed, the fifth wheel 106 can be decoupled, and the truck 102 can be moved out from under the trailer 104 via the front ramp 606*a*. In addition, the first gladhands coupler 110 can be disengaged from the second gladhands coupler 112, thereby engaging the pneumatic brake of the trailer 104 and locking wheels 116*a*, 116*b*.

Figure 6A:
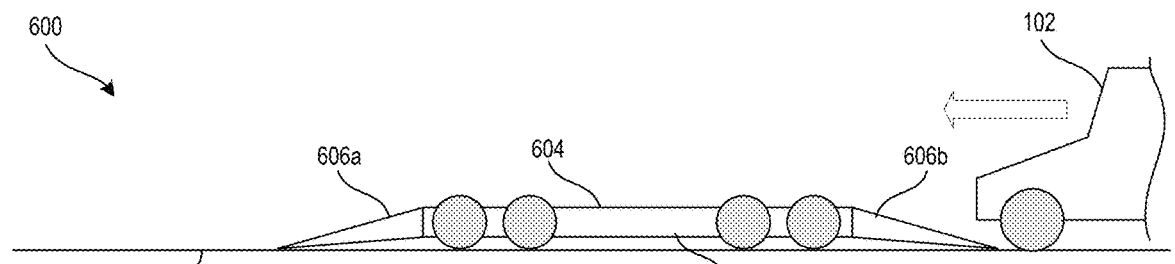
FIGS. 6A-6B illustrate initial positioning of a truck with respect to a rear trailer hostler with integrated ramps and subsequent parking of a trailer on the rear trailer hostler, respectively, according to one or more embodiments of the disclosed subject matter.
Figure 6B:
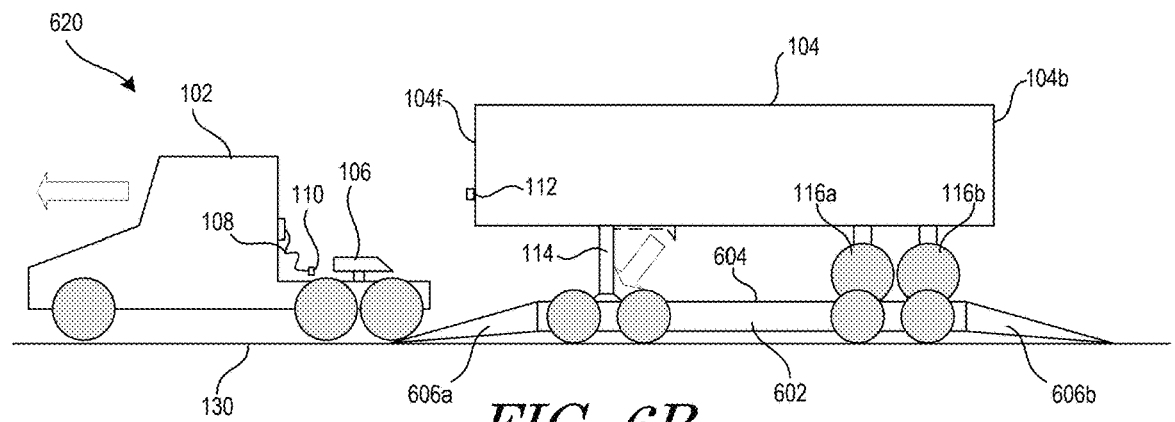
Figure 6C:
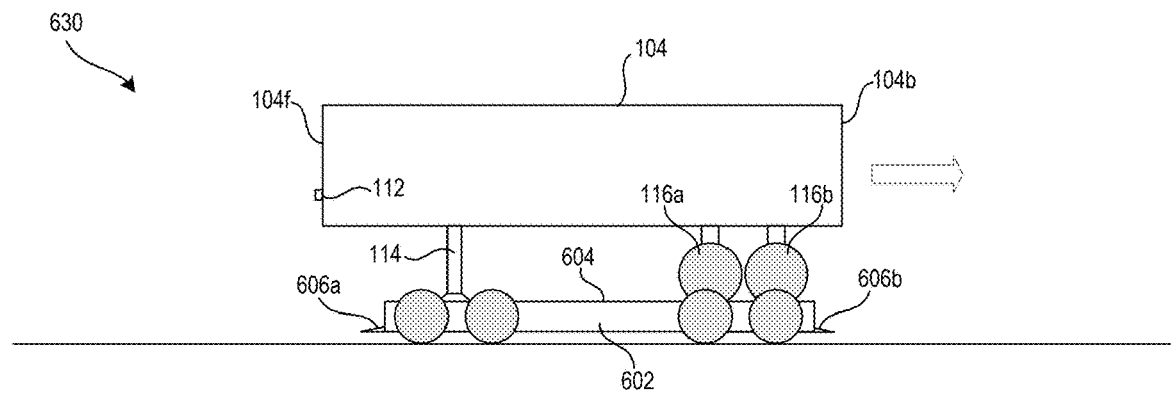
FIGS. 6C-6D illustrate use of the rear trailer hostler to independently move the trailer without disengaging its pneumatic brakes, respectively, according to one or more embodiments of the disclosed subject matter.
Figure 6D:
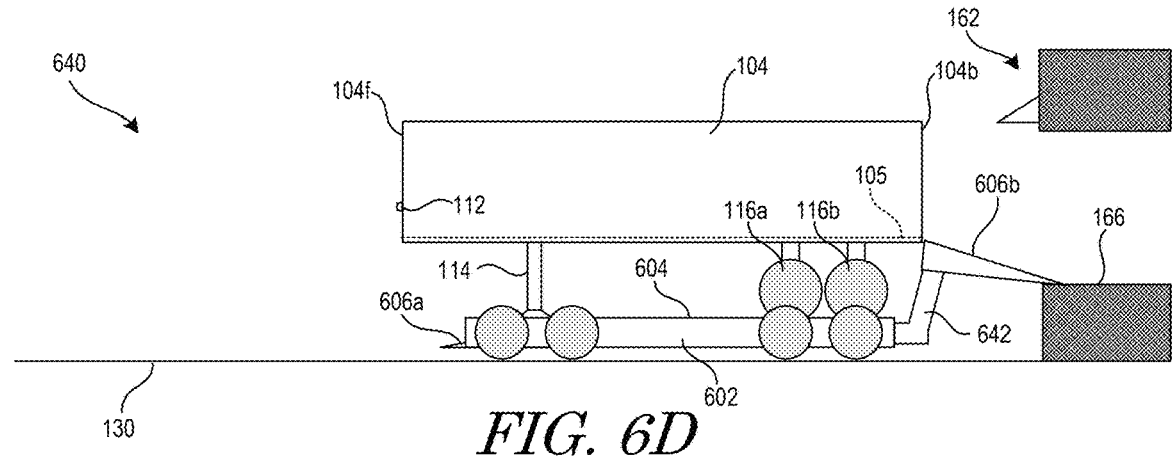

For example, as shown in transport stage 630 of FIG. 6C, the front and rear ramps 606*a-b* can be retracted into RTH 602, or otherwise positioned in a stowed orientation (e.g., with the ramp raised out of contact with the ground 130), to allow the RTH 602 to move via its own wheels (e.g., without requiring a separate front hostler). With the trailer 104 fully supported atop the upper support surface 604, the trailer 104 can be subsequently moved without disengaging the pneumatic brakes of the trailer 104. In other words, the trailer 104 can be moved despite locked wheels 116*a*, 116*b* by using the wheels of the RTH 602 instead. In some embodiments, one of the ramps 606*b* can be deployed (e.g., via extension arm 642 or other type of actuator) from the RTH 602 at a loading dock 162, for example, to act as a bridge between the trailer cargo bed 105 and the floor 166 of the dock.

Figure 7:
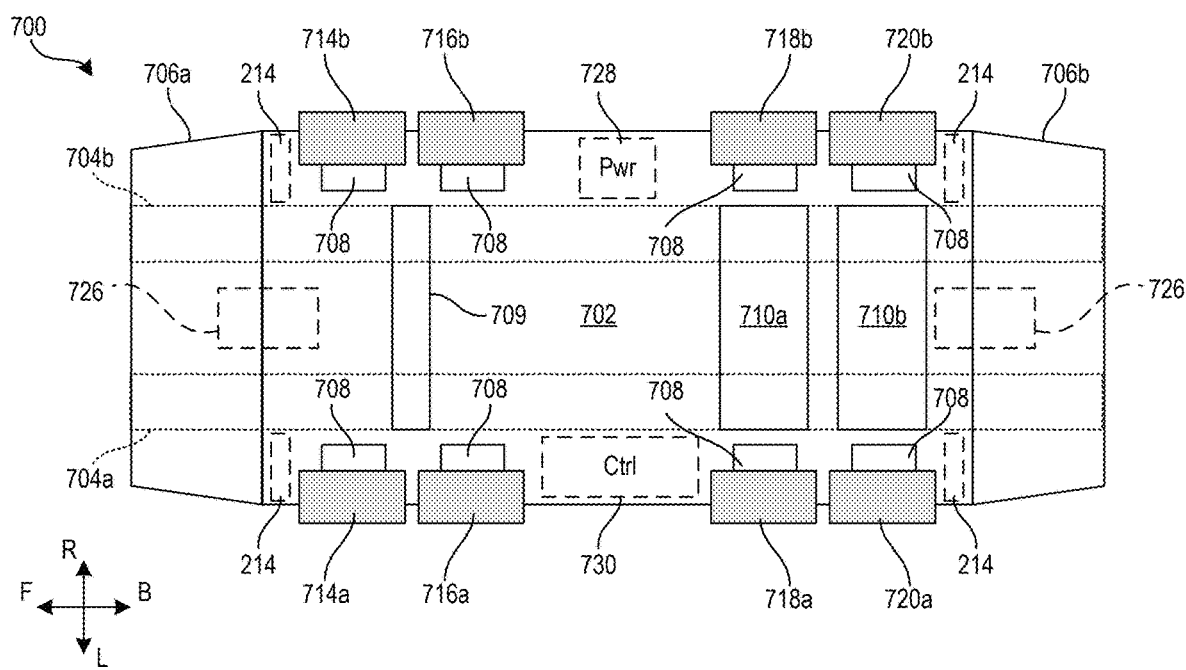
FIG. 7 is a simplified plan view schematic diagram of an exemplary rear trailer hostler with integrated ramps, according to one or more embodiments of the disclosed subject matter.

FIG. 7 shows an exemplary configuration of an RTH 700 with integrated ramps that can be used to move a trailer parked thereon. In the illustrated example, RTH 700 includes a central support body 702, a first ramp 706*a* located at one longitudinal end of the support body 702, and a second ramp 706*b* located at an opposite longitudinal end of the support body 702. Each of the ramps 706*a-b* can be repositionable (e.g., retracted into the central support body 702 or at least raised off of the ground) via respective ramp actuators 726 (e.g., electric actuators, pneumatic actuators, and/or hydraulic actuators) to allow movement of the RTH 700 with or without a trailer parked thereon. In some embodiments, an upper surface of the RTH 700 can have a pair of tread paths 704*a*, 704*b* that a truck can follow to park a trailer over the central support body 702, for example, with the trailer landing gear positioned on a landing gear support surface 709 (e.g., a recessed surface) and wheels of the trailer positioned on respective wheel support surfaces 710*a-b* (e.g., laterally-extending curved grooves).

In some embodiments, the RTH can further include one or more sensors configured to detect features in an environment surrounding the trailer. In the illustrated example of FIG. 7, RTH 700 includes a plurality of sensors 214 within or supported on ramps 706*a-b* and central support body 702. Such sensors 214 can include, but are not limited to, a navigation unit, an inertial measurement unit, an odometer, a light detection and ranging (LIDAR) system, radio detection and ranging (RADAR) system, an infrared imager, an optical imager, a trailer weight sensor, or any combination thereof. In some embodiments, a controller 730 is mounted on or within the chassis of the RTH 700 (e.g., within the central support body 702 in the illustrated example). The controller 730 can be used to control operation of the RTH 700. For example, the controller 730 can send control signals to propulsion unit(s) 708 to direct movement of the RTH 700 with or without a trailer parked thereon.

In the illustrated example, each side of the central support body 702 can have a pair of front wheels 714, 716 and a pair of rear wheels 718, 720. Alternatively, in some embodiments, additional or fewer wheels can be provided. In some embodiments, some or all of the wheels 714-720 can comprise pneumatic tires, airless tires, or substantially solid polymer tires. In some embodiments, the wheels of the RTH can be independently driven or steered. For example, each wheel 714-720 can have a respective propulsion unit 708 (e.g., electric motor). A power supply 728 (e.g., battery for electrical power or gas tank for an internal combustion engine) can be included for powering operation of the RTH 700 (e.g., propulsion units 708 and/or controller 730). Alternatively or additionally, in some embodiments, some or all of the wheels can share a propulsion unit via a drivetrain or transmission. Alternatively or additionally, in some embodiments, only some of the wheels are driven (e.g., a front-wheel drive configuration where front wheels 714-716 provide both drive and steering, or a rear-wheel drive configuration where rear wheels 718-720 provide drive and front wheels 714-716 provide steering). In some embodiments, some or all of the wheels 714-720 can be omnidirectional so as to allow simultaneous or sequential movement of the RTH in two directions in a horizontal plane without requiring separate steering (e.g., without changing a direction of an axis of rotation of the wheel with respect to the RTH). In some embodiments, some or all of the wheels 714-720 can be independently steered (e.g., to change a direction of an axis of rotation of the wheel with respect to the RTH).

VII. Rear Trailer Hostler with Static Ramps

FIGS. 8A-8D illustrate exemplary operations for using a rear trailer hostler (RTH) to move a parked trailer without disengaging its pneumatic air brakes, for example, by directly parking the trailer atop the RTH. For example, as shown in the positioning stage 800 of FIG. 8A, an RTH 802 can be disposed between a pair of separate static ramps 806, 808 extending between a level of the ground 130 and an upper support surface 804. The truck 102, which is coupled to the trailer 104 via fifth-wheel 106 and air supply line 108, can drive over the support surface 804 via the ramps (e.g., up the first ramp 808 and down the first ramp 806 in the illustrated example) in order to park the trailer 104 atop the RTH 802. Alternatively, in some embodiments, the RTH 802 can be initially parked in a below-grade area, e.g., such that support surface 804 is substantially level with the level of the ground 130, so that the truck 102 can park the trailer 104 directly on the support surface 804 without using a ramp.

Figure 8A:
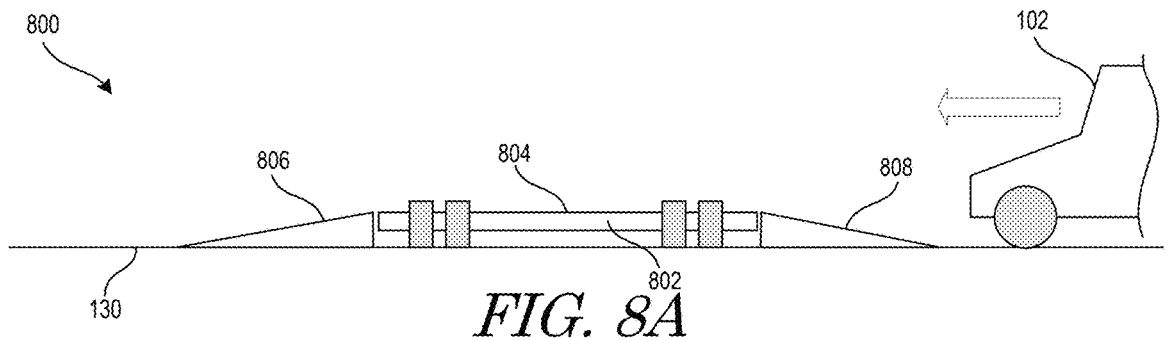
FIGS. 8A-8B illustrate use of static ramps for initial positioning of a truck with respect to a rear trailer hostler and subsequent parking of a trailer on the rear trailer hostler, respectively, according to one or more embodiments of the disclosed subject matter.
Figure 8B:
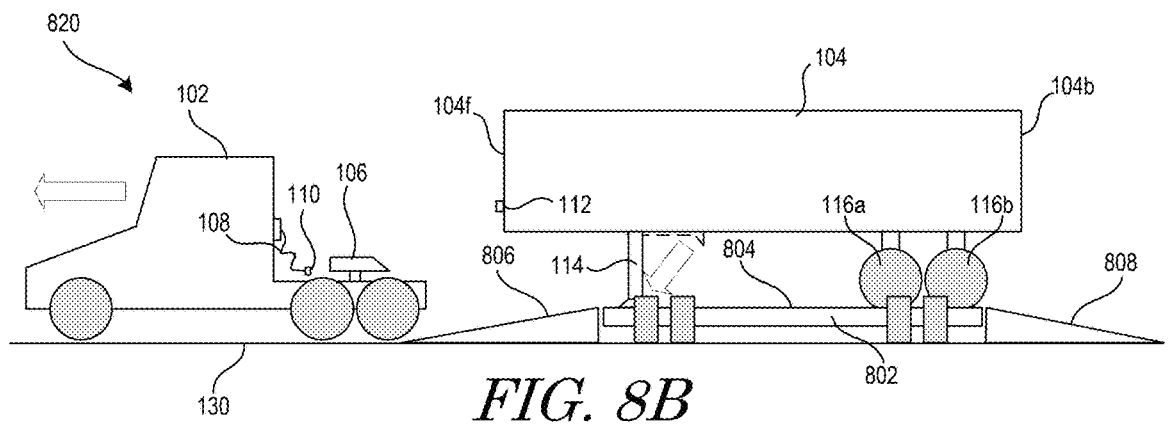
Figure 8C:
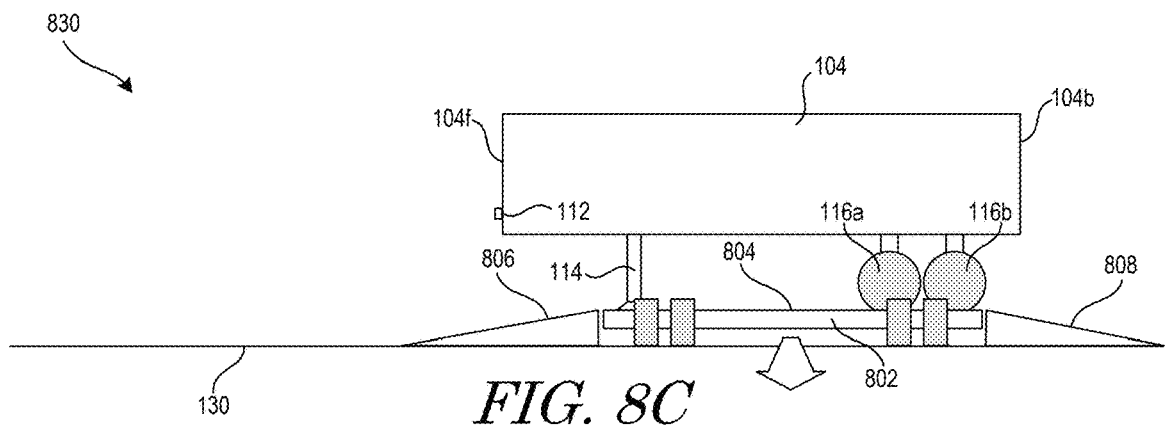
FIGS. 8C-8D illustrate use of the rear trailer hostler to independently move the trailer without disengaging its pneumatic brakes, respectively, according to one or more embodiments of the disclosed subject matter.
Figure 8D:
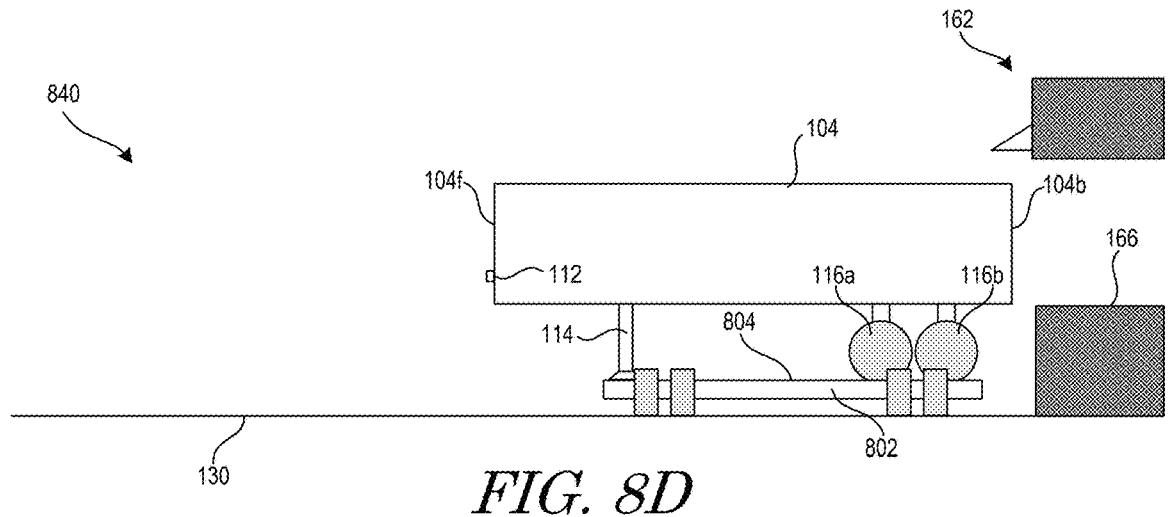

As shown in the parking stage 820 of FIG. 8B, the trailer 104 can be disengaged from the truck 102. For example, the landing gear 114 can be deployed, the fifth wheel 106 can be decoupled, and the truck 102 can be moved out from under the trailer 104 via the second ramp 806. In addition, the first gladhands coupler 110 can be disengaged from the second gladhands coupler 112, thereby engaging the pneumatic brake of the trailer 104 and locking wheels 116a, 116b. Since the ramps 806, 808 are not otherwise connected to the RTH 802, once the truck 102 is disengaged, the RTH 802 with the trailer 104 fully supported atop the upper support surface 804 can move out from between the ramps 806, 808, for example, by moving in a lateral direction (e.g., perpendicular to a plane of the page), as shown in transport stage 830 of FIG. 8C. The RTH 802 can move independently using its own wheels (e.g., to a loading dock 162 in the docking stage of FIG. 8D), without otherwise requiring the pneumatic brakes of the trailer 104 to be disengaged. In other words, the trailer 104 can be moved despite locked wheels 116a, 116b by using the wheels of the RTH 802 instead. In some embodiments, some or all of the wheels of RTH 802 can be omnidirectional (e.g., so as to allow simultaneous or sequential movement of the RTH in two directions in a horizontal plane without requiring separate steering) and/or independently steered (e.g., to change a direction of an axis of rotation of the wheel with respect to the RTH).

VIII. Methods for Moving Trailer Using Rear Trailer Hostler

Figures 9A, 9B:
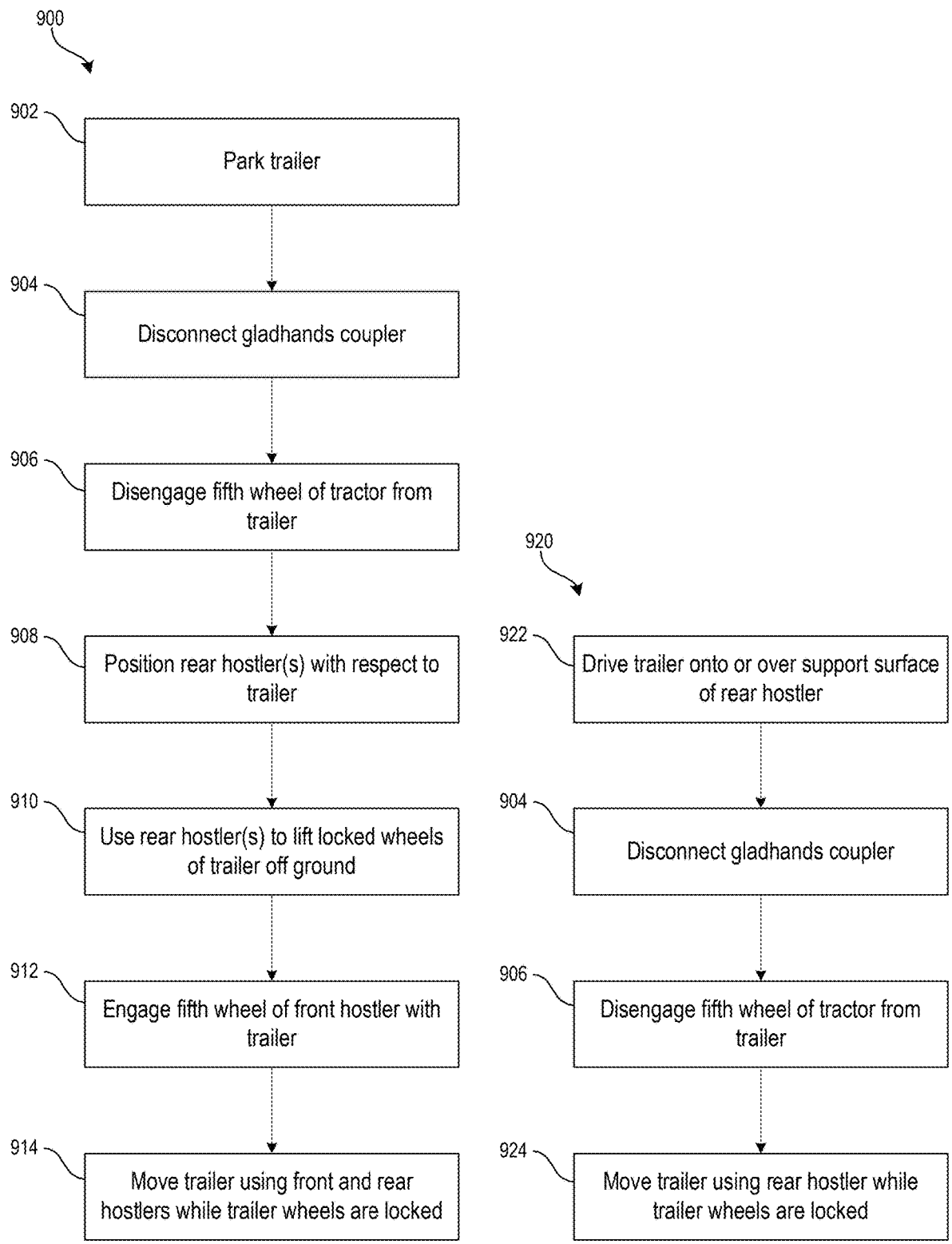
FIG. 9A is a process flow diagram of an exemplary method for parking and moving a trailer without disengaging its pneumatic brakes by using a front hostler and rear trailer hostler, according to one or more embodiments of the disclosed subject matter.
FIG. 9B is a process flow diagram of an exemplary method for parking and moving a trailer without disengaging its pneumatic brakes by using only a rear trailer hostler, according to one or more embodiments of the disclosed subject matter.

FIG. 9A shows an exemplary method 900 for use of a rear trailer hostler (RTH) to move a parked trailer. The method 900 can begin at process block 902, where a trailer is parked, for example, by driving a truck connected to the trailer to position the trailer at a desired parking location. The method 900 can proceed to process block 904, where the pneumatic supply lines from the truck can be disconnected from the trailer (e.g., by removing gladhands couplers), thereby engaging the pneumatic brakes of the trailer. The method 900 can proceed to process block 906, where the truck can be disconnected from the trailer, for example, by unlocking the fifth wheel and driving the truck forward away from the trailer.

The method 900 can proceed to process block 908, where one or more RTHs are positioned with respect to the parked trailer. In some embodiments, the RTH autonomously positions itself underneath or adjacent to the parked trailer, for example, by detecting the position and/or pose of the trailer. Alternatively or additionally, in some embodiments, the RTH can be manually positioned with respect the parked trailer, for example, by receiving commands from a local or remote operator (e.g., teleoperation). Alternatively or additionally, in some embodiments, the parking of process block 902 can be effective to position the RTH with respect to the trailer, for example, by reversing the trailer into a central access of the RTH.

The method 900 can proceed to process block 910, where the RTH is used to lift the locked wheels of the trailer off of the ground. In some embodiments, the RTH can lift the trailer, for example, by contact with the trailer tires, the trailer axle, the trailer rear fender, or any combination thereof. For example, one or more lifting mechanisms of a trailer lift unit (TLUs) of the RTH can displace vertically and/or horizontally to effect vertical movement of the parked trailer.

The method 900 can proceed to process block 912, where another truck, such as a front hostler, can connect to the trailer, for example, by engaging and locking the fifth wheel of the hostler to the trailer. In some embodiments, the front hostler autonomously positions itself with respect to a front end of the trailer and automatically couples thereto, for example, by detecting the position and/or pose of the trailer. Alternatively or additionally, in some embodiments, the front hostler can be manually positioned with respect to the parked trailer, for example, driven by a human operator or by receiving commands from a local or remote operator (e.g., teleoperation).

The method 900 can proceed to process block 914, where the trailer is moved (e.g., for repositioning in a loading yard or parking lot) by driving the front hostler. In some embodiments, the front hostler can send signals to the RTH, for example, to coordinate transport of the trailer. In some embodiments, the RTH actively operates during transport of the trailer by the front hostler, for example, by adjusting drive and steering of the wheels of RTH to follow the front hostler (e.g., based on the signals received from the front hostler). Alternatively, in some embodiments, RTH passively operates during transport of the trailer by the front hostler, for example, where the wheels of the RTH move independently based on the motion of the front hostler and trailer without any control by the RTH (e.g., the RTH operating as a dolly for the trailer). In some embodiments, the front hostler, the RTH, or both can operate autonomously, for example, by planning and following a route to a destination (e.g., loading dock). Alternatively or additionally, in some embodiments, at least the front hostler may be manually operated to move the trailer, for example, driven by a human operator or by receiving commands from a local or remote operator (e.g., teleoperation).

FIG. 9B shows another exemplary method 920 for use of an RTH to move a parked trailer. The method 920 can begin at process block 922, where a trailer is parked, for example, by driving a truck connected to the trailer over the RTH to position the trailer atop a support surface of the RTH. In some embodiments, the truck employs one or more ramps to position the trailer atop the support surface of the RTH. Such ramps can be part of the RTH (retracted or otherwise stowed when movement of the RTH is desired) or separate from the RTH (e.g., one or more static ramps adjacent to the RTH). Alternatively or additionally, the RTH can be disposed in a below-grade area such the RTH support surface is substantially at ground level. The method 920 can proceed to process block 904, where the pneumatic supply lines from the truck can be disconnected from the trailer (e.g., by removing gladhands couplers), thereby engaging the pneumatic brakes of the trailer. The method 920 can proceed to process block 906, where the truck can be disconnected from the trailer, for example, by unlocking the fifth wheel and driving the truck forward away from the trailer.

The method 920 can proceed to process block 924, where the trailer is moved (e.g., for repositioning in a loading yard or parking lot) by driving the RTH (e.g., without any separate vehicle connection, such as a front hostler). In some embodiments, the RTH can operate autonomously, for example, by planning and following a route to a destination (e.g., loading dock). Alternatively or additionally, in some embodiments, the RTH may be manually operated to move the trailer, for example, by receiving commands from a local or remote operator (e.g., teleoperation).

Although some of blocks 902-914 of method 900 and blocks 904-906 and 922-924 of method 920 have been described as being performed once, in some embodiments, multiple repetitions of a particular process block may be employed before proceeding to the next decision block or process block. In addition, although blocks 902-914 of method 900 and blocks 904-906 and 922-924 of method 920 have been separately illustrated and described, in some embodiments, process blocks may be combined and performed together (simultaneously or sequentially). Moreover, although FIGS. 9A-9B illustrates a particular order for blocks 902-914 of method 900 and blocks 904-906 and 922-924 of method 920, embodiments of the disclosed subject matter are not limited thereto. Indeed, in certain embodiments, the blocks may occur in a different order than illustrated or simultaneously with other blocks.

IX. Rear Trailer Hostler Control Methods

Figures 10A, 10B:
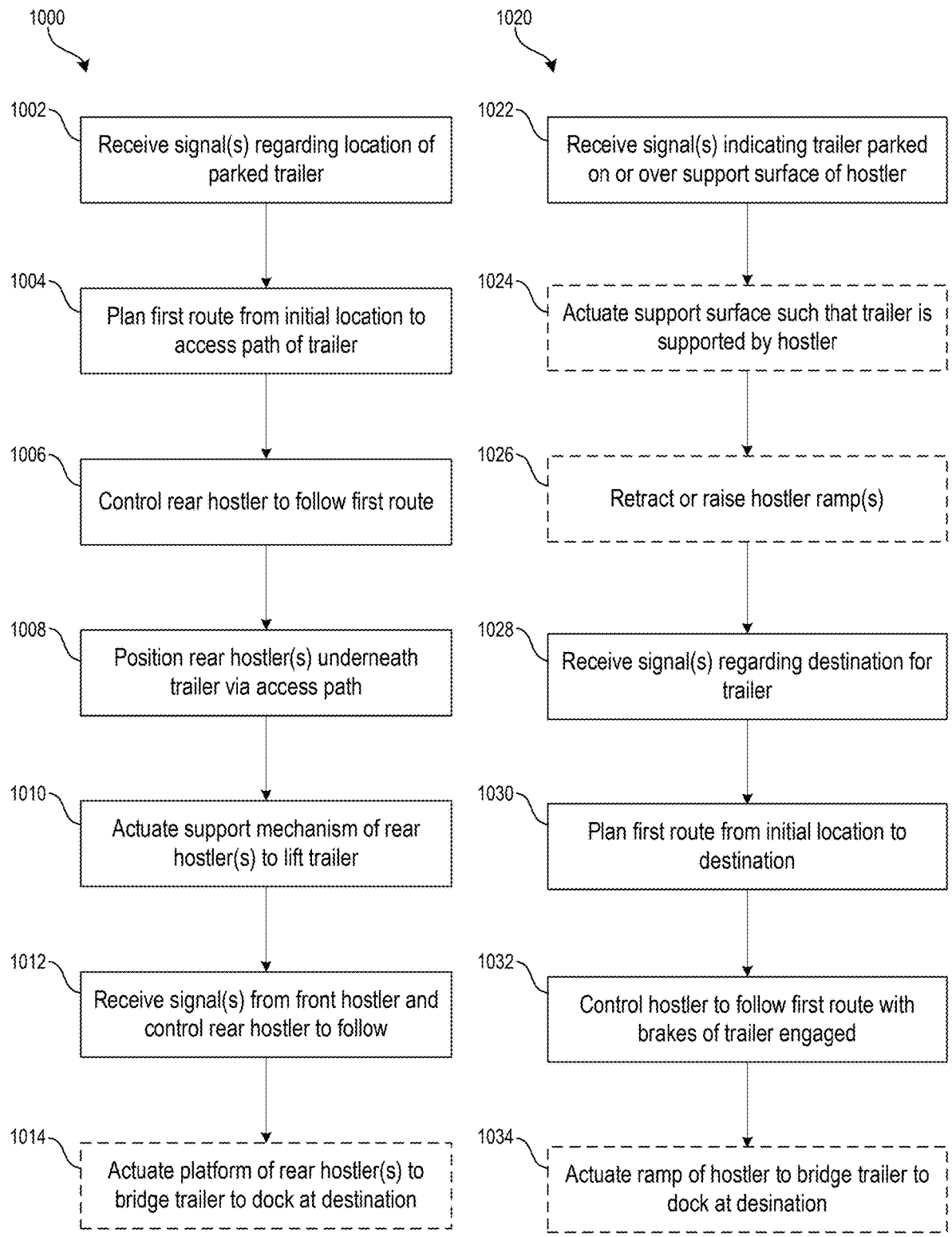
FIG. 10A is a process flow diagram of an exemplary control method of a rear trailer hostler for moving a trailer in cooperation with a front hostler, according to one or more embodiments of the disclosed subject matter.
FIG. 10B is a process flow diagram of an exemplary control method of a rear trailer hostler for independently moving at trailer, according to one or more embodiments of the disclosed subject matter.

FIG. 10A shows an exemplary method 1000 for control of a rear trailer hostler (RTH) operating with a front hostler to move a parked trailer. The method 1000 can begin at process block 1002, where one or more signals are received identifying a parked trailer to be moved. In some embodiments, the one or more signals can be sent by a human user or operator, by a front hostler, by a central command or logistics system, or any combination thereof. For example, a signal from a logistic coordination system can specify a trailer to be moved (e.g., a parking location or other identifier) and a location (e.g., loading dock) to which the trailer should be moved.

The method 1000 can proceed to process block 1004, where the RTH can plan a first route from its initial location to a selected access path (e.g., front access, side access, or rear access) for final positioning with respect to the trailer. In some embodiments, the RTH can plan the first route to stay within a traversable area of the lot while avoiding obstacles therein and taking into account rules of the road or any other predefined rules of operation. Once the first route has been planned, the method 1000 can proceed to process block 1006, where the RTH is controlled to follow the first route, for example, via control of a drive by wire system of the RTH (e.g., including steering, propulsion, or both). In some embodiments, the control of process block 1006 can include adjusting the route or motion along the route (e.g., velocity, acceleration, or both) as the RTH proceeds along the first route to account for dynamic or unexpected obstacles (e.g., pedestrians, other moving vehicles, etc.).

The method 1000 can proceed to process block 1008, where the RTH can be positioned underneath or adjacent to the trailer via the selected access path. For example, the drive by wire system of the RTH can be further controlled to position the RTH with respect to the trailer. In some embodiments, the RTH can be configured to detect the position and pose of the parked trailer. The positioning of the process block 1008 can be such that a position and pose of the RTH is aligned based on and with respect to the detected position and pose of the parked trailer.

The method 1000 can proceed to process block 1010, where one or more support mechanisms of the RTH are actuated to lift the trailer, or at least the locked wheels thereof, off of the ground. In some embodiments, an electric actuator, a pneumatic actuator, a hydraulic actuator, or any combination thereof can be used to vertically displace the tires of the trailer, the axle of the trailer, a rear fender of the trailer, or any other portion of the trailer undercarriage. In some embodiments, the actuation of process block 1010 can be a two-step process. For example, a first step can involve horizontal displacement by the actuators to contact portions of the trailer (e.g., by extending laterally inward or by rotating from a longitudinally extending orientation to a laterally extending orientation), and a second step can involve horizontal and/or vertical displacement by the actuators to lift the contacted portions of the trailer.

The method 1000 can proceed to process block 1012, where one or more signals can be received from a front hostler and the RTH can be controlled to follow the front hostler. For example, the front hostler can send signals regarding a planned route (e.g., planned by the front hostler or a central command) to a destination (e.g., loading dock) and/or real-time drive conditions (e.g., upcoming turn, current speed, impending stop, etc.). The RTH can actively operate based on the signals to follow the front hostler, for example, via control of a drive by wire system of the RTH (e.g., including steering, propulsion, or both).

Once the trailer arrives at its desired destination, the method 1000 can proceed to optional process block 1014, where a platform of the RTH can be controlled to bridge a height difference between a cargo bed of the trailer and the floor of the loading dock. For example, one or more actuators of the platform can be controlled to vertically displace part of the platform. In some embodiments, the RTH can detect heights of the cargo bed and the dock floor, and can automatically adjust one or both ends of the platform via the actuators to substantially match an adjacent part of the trailer or loading dock.

FIG. 10B shows an exemplary method 1020 for control of an RTH to move a parked trailer on its own. The method 1020 can begin at process block 1022, where one or more signals are received indicating that a trailer has been parked over or on a support surface of the RTH. In some embodiments, the signal can be received from a truck that has parked the trailer on the RTH and subsequently disconnected from the trailer. Alternatively or additionally, in some embodiments, the signal can be received from a local or remote operator or from a central command system. Alternatively or additionally, in some embodiments, the signal can be received from a sensor within the parking lot or yard, for example, a camera system configured to detect the presence of a trailer atop the RTH. Alternatively or additionally, the signal can be received within the RTH itself, for example, based on sensing of a weight on the support surface of the RTH.

The method 1020 can proceed to optional process block 1024, where the support surface of the trailer can be actuated such that the trailer is supported by the RTH. In some embodiments, where the trailer is parked over, but not necessarily in contact with the support surface of the RTH, the support surface can be raised into direct contact with the trailer for subsequent movement of the trailer. In some embodiments, an electric actuator, a pneumatic actuator, a hydraulic actuator, or any combination thereof can be used to vertically displace the support surface of the RTH. The method 1020 can proceed to optional process block 1026, where any ramps of the RTH can be retracted, stowed, or otherwise raised up off the ground. In some embodiments, an electric actuator, a pneumatic actuator, a hydraulic actuator, or any combination thereof can be used to move the ramps.

The method 1020 can proceed to process block 1028, where the RTH can receive one or more signals regarding a destination for the trailer. In some embodiments, the one or more signals can be sent by a human user or operator, by a central command or logistics system, or any combination thereof. For example, a signal from a logistic coordination system can specify a location (e.g., loading dock) to which the trailer should be moved.

The method 1020 can proceed to process block 1030, where the RTH can plan a first route from its initial location to the destination. In some embodiments, the RTH can plan the first route to stay within a traversable area of the lot while avoiding obstacles therein and taking into account rules of the road or any other predefined rules of operation. Once the first route has been planned, the method 1020 can proceed to process block 1032, where the RTH is controlled to follow the first route, for example, via control of a drive by wire system of the RTH (e.g., including steering, propulsion, or both). In some embodiments, the control of process block 1032 can include adjusting the route or motion along the route (e.g., velocity, acceleration, or both) as the RTH proceeds along the first route to account for dynamic or unexpected obstacles (e.g., pedestrians, other moving vehicles, etc.).

Once the trailer arrives at its desired destination, the method 1020 can proceed to optional process block 1034, where a ramp of the RTH can be controlled to bridge a height difference between a cargo bed of the trailer and the floor of the loading dock. For example, one or more actuators of the ramp can be controlled to extend from the RTH and connect between the trailer and the dock floor. In some embodiments, the RTH can detect heights of the cargo bed and the dock floor, and can automatically adjust one or both ends of the ramp via the actuators to substantially match an adjacent part of the trailer or loading dock.

Although some of blocks 1002-1014 of method 1000 and blocks 1022-1034 of method 1020 have been described as being performed once, in some embodiments, multiple repetitions of a particular process block may be employed before proceeding to the next decision block or process block. In addition, although blocks 1002-1014 of method 1000 and blocks 1022-1034 of method 1020 have been separately illustrated and described, in some embodiments, process blocks may be combined and performed together (simultaneously or sequentially). Moreover, although FIGS. 10A-10B illustrates a particular order for blocks 1002-1014 of method 1000 and blocks 1022-1034 of method 1020, embodiments of the disclosed subject matter are not limited thereto. Indeed, in certain embodiments, the blocks may occur in a different order than illustrated or simultaneously with other blocks.

X. Hostler Systems

Figure 11A:
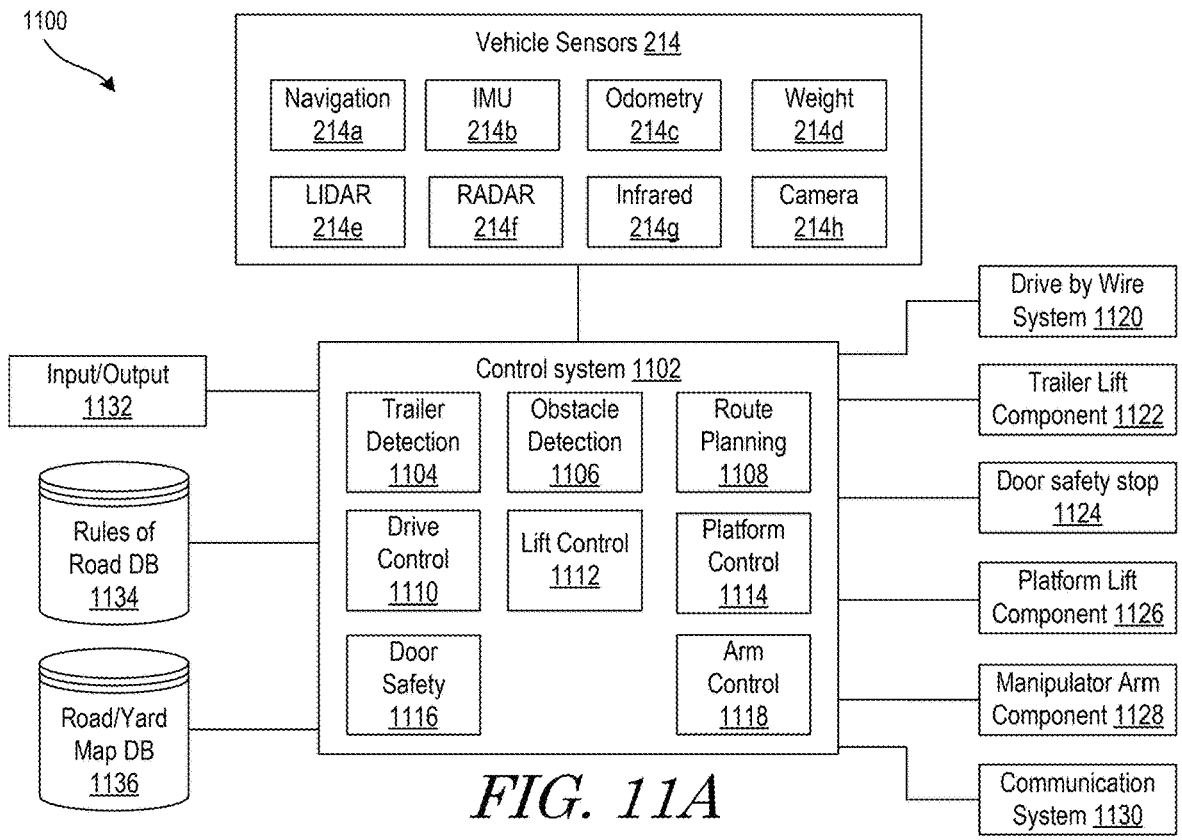
FIG. 11A is a simplified schematic diagram of an exemplary system configuration for a rear hostler, according to one or more embodiments of the disclosed subject matter.

FIG. 11A illustrates an exemplary configuration of a rear trailer hostler (RTH) system 1100. The system 1100 can include a control system 1102, one or more vehicle sensors 214, a drive-by-wire system 1120, a trailer lift unit or component 1122, a communication system 1130, and one or more memories or databases (e.g., database 1134 storing driving rules or "rules of the road" and/or database 1136 storing a map of a road network or loading yard in which the RTH operates). In some embodiments, the system 1100 can optionally include a user interface 1132, a door safety stop actuator 1124, a platform lift unit or component 1126, a manipulator arm unit or component 1128, or any combination thereof.

The vehicle sensors 214 can include a navigation sensor 214a (e.g., a global positioning system (GPS), etc.), an inertial measurement unit (IMU) 214b, an odometry sensor 214c, a trailer weight sensor 214d, a laser detection and ranging (LIDAR) system 214e, a radio detection and ranging (RADAR) system 214f, an infrared (IR) imager 214g, a visual camera 214h, or any combination thereof. Other sensors are also possible according to one or more contemplated embodiments. For example, sensors 214 can further include an ultrasonic or acoustic sensor for detecting distance or proximity to objects, a compass to measure heading, inclinometer to measure an inclination of the RTH or a path traveled by the RTH (e.g., to assess if the supported trailer may be subject to slippage), a Geiger counter for detection of ionizing radiation (e.g., to assess whether a cargo is carrying nuclear material), or any combination thereof.

In some embodiments, the navigation sensor 214a can be used to determine relative or absolute position of the RTH (and thus the trailer when connected thereto). In some embodiments, IMU 214b can be used to determine orientation or position of the RTH (e.g., with respect to a front hostler connected or connecting to the trailer). For example, the IMU 214b can comprise one or more gyroscopes or accelerometers, such as a microelectromechanical system (MEMS) gyroscope or MEMS accelerometer. In some embodiments, the IMU 214b includes at least a yaw gyro. For example, the IMU 214b can be used to help identify trailer angle, for example, to supplement detection by and/or provide a degree of redundancy to the sensor suite of the front hostler (e.g., LIDAR or other sensing methods of an autonomous system).

In some embodiments, the odometry sensor 214c can detect a change in position of the RTH over time (e.g., distance). In some embodiments, odometry sensors 214c can be provided for one, some, or all of wheels of the RTH, for example, to measure corresponding wheel speed, rotation, and/or revolutions per unit time, which measurements can then be correlated to change in position of the RTH. For example, the odometry sensor 214c can include an encoder, a Hall effect sensor measuring speed, or any combination thereof.

In some embodiments, the weight sensor 214d can detect a weight upon or applied to the RTH, for example, when the trailer is parked on the RTH and/or when the RTH lifts the trailer off the ground. In some embodiments, the weight sensor 241d can be provided for one, some, or all of wheels of the RTH, for example, to measure movement-induced weight fluctuations (e.g., as an indication of liquid cargo carried by the trailer) and/or detect an imbalance in cargo weight (e.g., as an indication of potentially unsafe transport condition). For example, the weight sensor can include a load cell, strain gauge, pressure sensor, or any other transducer capable of measuring weight or changes therein.

In some embodiments, the LIDAR system 214e can use laser illumination to measure distances to obstacles or features within an environment surrounding the RTH. In some embodiment, the LIDAR system 214e can be configured to provide three-dimensional imaging data of the environment, and the imaging data can be processed (e.g., by the LIDAR system itself or by a module of control system 1102) to generate a 360-degree view of the environment. For example, the LIDAR system 214e can include an illumination light source (e.g., laser or laser diode), an optical assembly for directing light to/from the system (e.g., one or more static or moving mirrors (such as a rotating mirror), phased arrays, lens, filters, etc.), and a photodetector (e.g., a solid-state photodiode or photomultiplier).

In some embodiments, the RADAR system 214f can use irradiation with radio frequency waves to detect obstacles or features within an environment surrounding the RTH. In some embodiment, the RADAR system 214f can be configured to detect a distance, position, and/or movement vector of an obstacle or feature within the environment. For example, the RADAR system 214f can include a transmitter that generates electromagnetic waves (e.g., radio frequency or microwaves), and a receiver that detects electromagnetic waves reflected back from the environment.

In some embodiments, the IR sensor 214g can detect infrared radiation from an environment surrounding the RTH. In some embodiments, the IR sensor 214g can detect obstacles or features in low-light level or dark conditions, for example, by including an IR light source (e.g., IR light-emitting diode (LED)) for illuminating the surrounding environment. Alternatively or additionally, in some embodiments, the IR sensor 214g can be configured to measure temperature based on detected IR radiation, for example, to assist in classifying a detected feature or obstacle as a person or vehicle.

In some embodiments, the camera sensor 214h can detect visible light radiation from the environment, for example, to determine obstacles or features within the environment. For example, the camera sensor 214h can include an imaging sensor array (e.g., a charge-coupled device (CCD) or complementary metal-oxide semiconductor (CMOS) sensor) and associated optic assembly for directing light onto a detection surface of the sensor array (e.g., lenses, filters, mirrors, etc.). In some embodiments, multiple camera sensors 214h can be provided in a stereo configuration, for example, to provide depth measurements.

The vehicle sensors 214 can be operatively coupled to the control system 1102, such that the control system 1102 can receive data signals from the sensors 214 and control operation of the RTH responsively thereto. In some embodiments, the control system 1102 includes one or more modules for operating the RTH. For example, the control system 1102 can include a trailer detection module 1104, an obstacle detection module 1106, a route planning module 1108, a drive control module 1110, a lift control module 1112, a platform control module 1114, a door safety module 1116, and/or a manipulator control module 1118.

In some embodiments, the trailer detection module 1104 can be configured to determine a position (e.g., location within an environment) and/or pose (e.g., orientation) of the trailer, for example, during initial positioning and coupling of the RTH to the trailer. The lift control module 1112 can be configured to control operation of trailer lift unit 1122, for example, to lift the trailer such that locked wheels thereof are off the ground once the RTH has been properly positioned with respect to the trailer.

In some embodiments, the route planning module 1108 can be configured to plan a route for the RTH to follow, for example, to position the RTH for coupling to the trailer and/or moving the lifted trailer to a destination. For example, the route planning module 1108 can employ data from the stored rules of the road 1134 and/or data regarding the road network or yard 1136 to plan a route from an initial or current location to a second location (e.g., destination for the trailer) that avoids known obstacles in the environment. Drive control module 1110 can then control the drive-by-wire system 1120 (e.g., an electrical or electro-mechanical system that controls steering, gearing, acceleration, and braking, for example, via control of wheels and respective propulsion units) to have the RTH follow the planned route. Alternatively or additionally, in some embodiments, the drive control module 1110 controls the drive-by-wire system 1120 based one or more signals received via communication system 1130 (e.g., transceiver for wireless communication), for example, to follow a front hostler pulling the trailer.

In some embodiments, the obstacle detection module 1106 can be configured to detect obstacles (e.g., impassable road features, other vehicles, pedestrians, etc.) as the RTH moves, for example, during initial positioning and coupling of the RTH to the trailer and/or moving the lifted trailer to a destination. The obstacle detection module 1106 can be further configured to avoid the detected obstacles, for example, by instructing, via the drive control module 1110, the RTH to follow an alternative path.

When the RTH is equipped with a platform to act as a bridge between the trailer and a loading dock, the platform control module 1114 can be configured to control a platform lift unit 1126, for example, to change a height of the platform. In some embodiments, the platform lift unit 1126 can be constructed to adjust a height of one end of the platform (e.g., adjacent to the dock) or both ends of the platform (e.g., one end adjacent to the dock and an opposite end adjacent to the trailer). In some embodiments, the platform control module 1114 can be configured to determine respective heights of a cargo bed of the trailer and the loading dock (e.g., based on detected data from the vehicle sensors 214 or other sensors in the environment, such as a sensor mounted at the loading dock), and then controlling the platform lift unit 1126 responsively thereto.

When the RTH is equipped with door safety stops, the door safety module 1116 can be configured to control a door safety stop actuator 1124 to automatically deploy the door safety stops, for example, in response to unsafe opening of the trailer doors. In some embodiments, the door safety module 1116 can be configured to determine a speed or acceleration of trailer door opening (e.g., based on detected data from the vehicle sensors 214 or other sensors in the environment, such as a sensor mounted at the loading dock), and then controlling the door safety stop actuator 1124 responsively thereto. For example, the door safety module 1116 can control the door safety stop actuator 1124 to deploy the door safety stops when a detected speed or acceleration of the door opening exceeds a predetermined value or is outside a predetermined range.

When the RTH is equipped with a manipulator arm, the arm control module 1118 can control the manipulator arm via the manipulator arm unit 1128 to open (or control opening of) the doors of the trailer. In some embodiments, the arm control module 1118 can direct the manipulator arm in response to a request by an operator (e.g., via user interface 1132) or automatically in response to a detected condition (e.g., where a detected weight suggests cargo may be impacting the doors).

In some embodiments, the user interface 1132 can be configured to receive input from a human operator and/or provide feedback (e.g., tactile, visual, auditory, etc.) to the human operator regarding operation of the RTH. For example, the input can comprise motion (e.g., rotation of a steering wheel, manipulation of a joystick, toggle of switch, etc.), audio (e.g., voice commands), or both. In some embodiments, the user interface 1132 can be used to control operation of the RTH or components thereof, for example, via respective modules of control system 1102 and/or overriding commands issued by modules of control system 1102. In some embodiments, the user interface 1132 can be configured as a remote work station for teleoperation of the RTH.

Figure 11B:
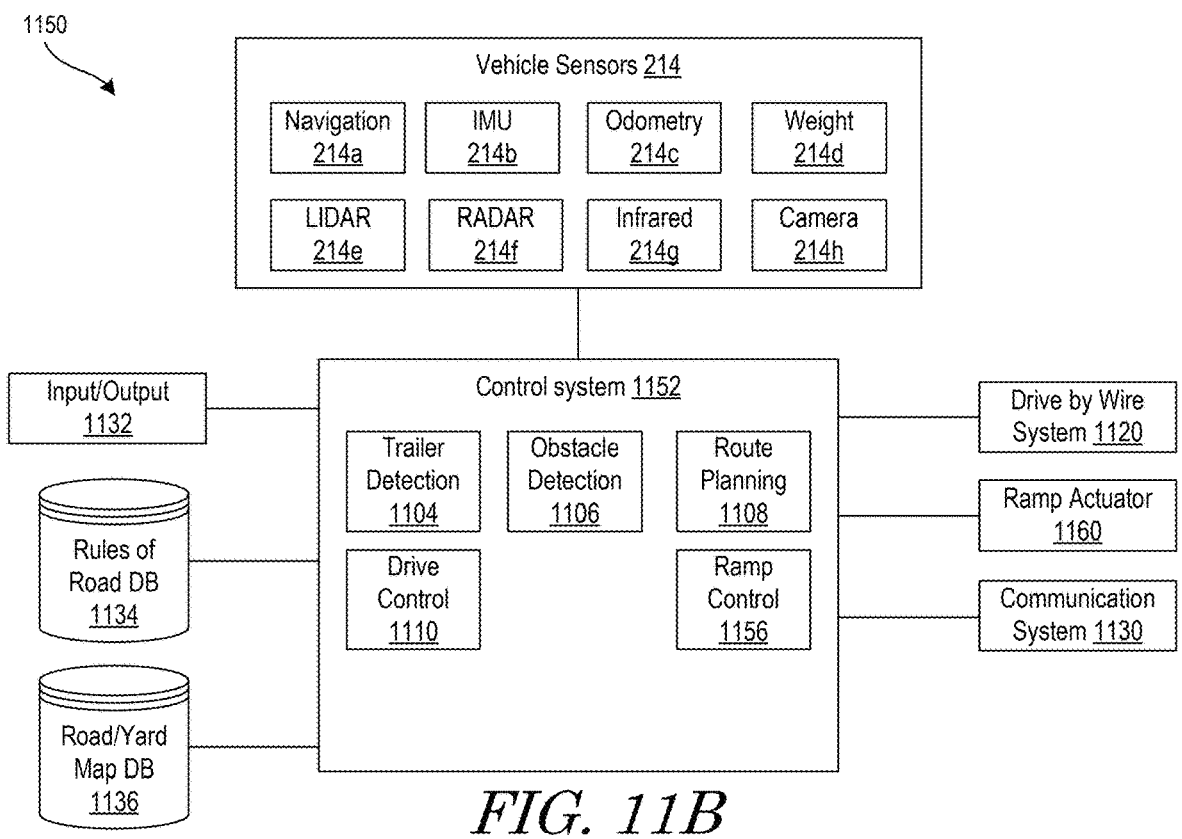
FIG. 11B is a simplified schematic diagram of another exemplary system configuration for a rear hostler, according to one or more embodiments of the disclosed subject matter.

FIG. 11B illustrates another exemplary configuration of a rear trailer hostler (RTH) system 1150, for example, an RTH that includes one or more integrated ramps. The system 1150 can include a control system 1152, one or more vehicle sensors 214, a drive-by-wire system 1158, a ramp actuation unit 1160, a communication system 1130, and one or more memories or databases (e.g., database 1134 storing driving rules or "rules of the road" and/or database 1136 storing a map of a road network or loading yard in which the RTH operates). The vehicle sensors 214 can be operatively coupled to the control system 1152, such that the control system 1152 can receive data signals from the sensors 214 and control operation of the RTH responsively thereto. In some embodiments, the control system 1152 includes one or more modules for operating the RTH. For example, the control system 1152 can include a trailer detection module 1104, an obstacle detection module 1106, a route planning module 1108, a drive control module 1110, and/or a ramp control module 1156.

In some embodiments, the ramp control module 1156 can be configured to control ramp actuation unit 1160, for example, to change deployment or orientation of one or more integrated ramps of the RTH. For example, the ramp control module 1156 can control the ramp actuation unit 1160 to deploy a ramp on the ground such that a truck can park a trailer on a support surface of the RTH. Subsequently, the ramp control module 1156 can control the ramp actuation until 1160 to stow the previously deployed ramp (e.g., by retracting the ramp into the RTH or otherwise moving the ramp off the ground to a non-obstructive orientation), for example, once the trailer has been parked and the truck disconnected and departed.

In some embodiments, the ramp control module 1156 can control the ramp actuation unit 1160 to deploy a ramp to act as a bridge between the trailer and loading dock. In some embodiments, the ramp actuation unit 1160 can be constructed to customize a height of one end of the ramp (e.g., adjacent to the dock) or both ends of the ramp (e.g., one end adjacent to the dock and an opposite end adjacent to the trailer). In some embodiments, the ramp control module 1156 can be configured to determine respective heights of a cargo bed of the trailer and the loading dock (e.g., based on detected data from the vehicle sensors 214 or other sensors in the environment, such as a sensor mounted at the loading dock), and then controlling ramp actuation unit 1160 responsively thereto.

Other components of system 1150 and operation thereof may be substantially similar to those of the above-described system 1100 with the same references numbers, and their descriptions will not be repeated here for convenience.

Figure 11C:
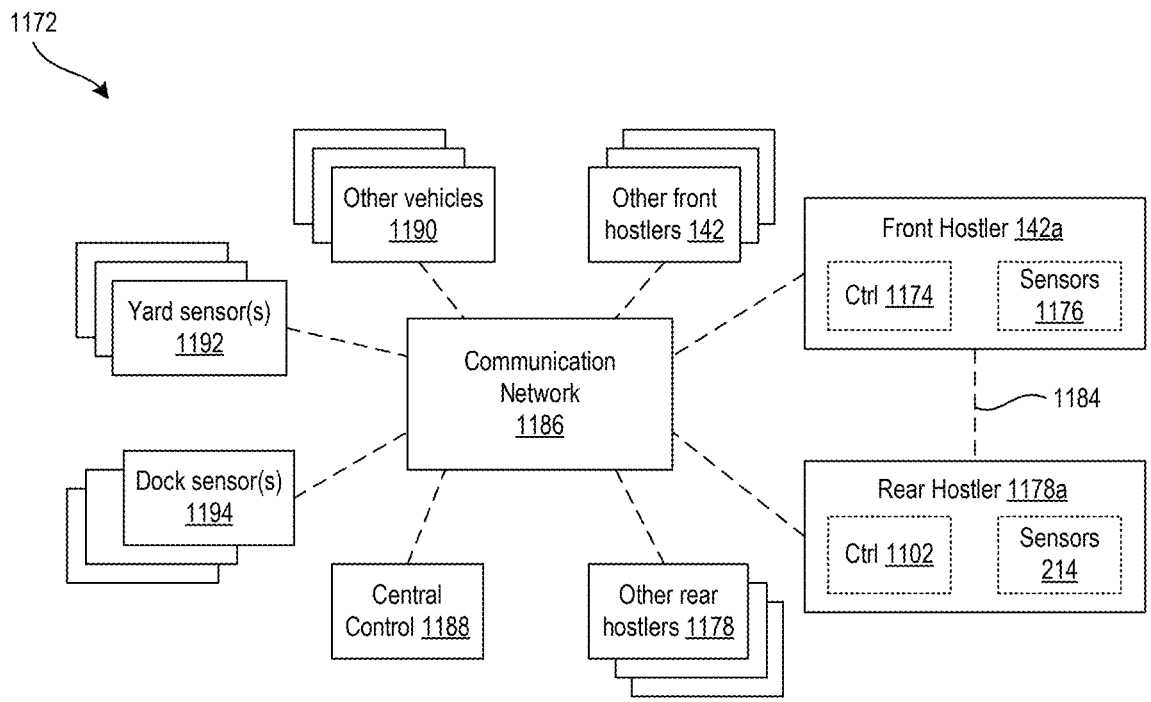
FIG. 11C is a simplified schematic diagram of an exemplary system configuration employing one or more rear hostlers, according to one or more embodiments of the disclosed subject matter.

FIG. 11C illustrates an exemplary configuration of an autonomous hostling system 1172 employing one or more RTHs 1178 and one or more front hostlers 142. As illustrated at 1178*a*, each RTH can have a respective control system 1102 and one or more sensors 214 to enable autonomous movement and operation thereof within a yard or lot. As illustrated at 102*a*, each front hostler 142 can have a respective control system 1174 and one or more sensors 1176 to enable autonomous movement and operation thereof within the yard or lot. Front hostler 142*a* and RTH 1178*a* may be connected to a same trailer and may communicate directly with each other, via intravehicle communication link 1184, to coordinate transport of the trailer. In some embodiments, the intravehicle communication link 1184 can be encrypted, and/or communication between the front hostler 102*a* and RTH 1178*a* can be ultra-wideband (UWB), Bluetooth, Wi-Fi, cellular, or any combination of the foregoing.

In some embodiments, the hostling system 1172 can further include a communication network 1186, a central command system 1188 (e.g., logistic coordination system or teleoperation station), other autonomous vehicles operating in the yard or lot (e.g., autonomous forklifts), a plurality of sensors 1192 disposed throughout the yard or lot (e.g., surveillance cameras, ranging radios for vehicle localization, etc.), a plurality of sensors 1194 disposed at the loading docks (e.g., LIDAR or ultrasonic sensors to assist in parking trailers at the dock) or any combination of the foregoing. The communication network 1186 can comprise any type of known communication medium or collection thereof and can employ any type of protocol, such as, but not limited to, Session Initiation Protocol (SIP), Internet Protocol Suite (e.g., transmission control protocol and internet protocol (TCP/IP)), Systems Network Architecture (SNA), and Internet Packet Exchange (IPX).

In some embodiments, the RTH 1178 can rely on data from the yard sensors 1192 and/or dock sensors 1194 (e.g., received via signals over communication network 1186) in place of or in addition to sensors 214 of the RTH 1178. In some embodiments, RTHs 1178, front hostlers 142, and/or other autonomous vehicles 1190 can broadcast their position, pose, and/or operational status (e.g., loaded with a trailer) to each other and/or to central control 1188, for example, for use in route planning or obstacle avoidance by the autonomously operated hostlers and vehicles. Alternatively or additionally, in some embodiments, the controller 1102 can communicate with the front hostler 142*a*, the trailer yard, and/or communication network 1186 (e.g., via communication system 1130) to allow remote knowledge of the position of the RTH 1178*a* and/or attached trailer. Alternatively or additionally, the controller 1102 can communicate additional information regarding the status or operation of the RTH 1178*a*, such as state of charge of a power supply or an error condition.

XI. Computer Implementation

Figure 11D:
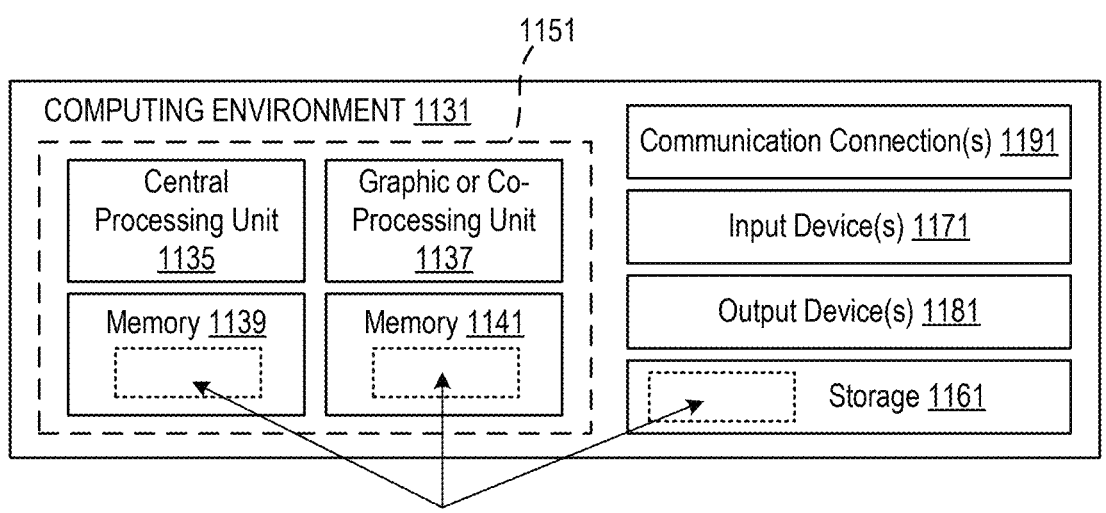
FIG. 11D depicts a generalized example of a computing environment in which the disclosed technologies may be implemented.

FIG. 11D depicts a generalized example of a suitable computing environment 1131 in which the described innovations may be implemented, such as aspects of controller 230, controller 730, control system 1102, control system 1152, control method 1000, or control method 1020. The computing environment 1131 is not intended to suggest any limitation as to scope of use or functionality, as the innovations may be implemented in diverse general-purpose or special-purpose computing systems. For example, the computing environment 1131 can be any of a variety of computing devices (e.g., desktop computer, laptop computer, server computer, tablet computer, etc.).

With reference to FIG. 11D, the computing environment 1131 includes one or more processing units 1135, 1137 and memory 1139, 1141. In FIG. 11D, this basic configuration 1151 is included within a dashed line. The processing units 1135, 1137 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 11D shows a central processing unit 1135 as well as a graphics processing unit or co-processing unit 1137. The tangible memory 1139, 1141 may be volatile memory (e.g., registers, cache, RAM), non-volatile memory (e.g., ROM, EEPROM, flash memory, etc.), or some combination of the two, accessible by the processing unit(s). The memory 1139, 1141 stores software 1133 implementing one or more innovations described herein, in the form of computer-executable instructions suitable for execution by the processing unit(s).

A computing system may have additional features. For example, the computing environment 1131 includes storage 1161, one or more input devices 1171, one or more output devices 1181, and one or more communication connections 1191. An interconnection mechanism (not shown) such as a bus, controller, or network interconnects the components of the computing environment 1131. Typically, operating system software (not shown) provides an operating environment for other software executing in the computing environment 1131, and coordinates activities of the components of the computing environment 1131.

The tangible storage 1161 may be removable or non-removable, and includes magnetic disks, magnetic tapes or cassettes, CD-ROMs, DVDs, or any other medium which can be used to store information in a non-transitory way, and which can be accessed within the computing environment 1131. The storage 1161 can store instructions for the software 1133 implementing one or more innovations described herein.

The input device(s) 1171 may be a touch input device such as a keyboard, mouse, pen, or trackball, a voice input device, a scanning device, or another device that provides input to the computing environment 1131. The output device(s) 1171 may be a display, printer, speaker, CD-writer, or another device that provides output from computing environment 1131.

The communication connection(s) 1191 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, radio-frequency (RF), or another carrier.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means. In any of the above described examples and embodiments, provision of a request (e.g., data request), indication (e.g., data signal), instruction (e.g., control signal), or any other communication between systems, components, devices, etc. can be by generation and transmission of an appropriate electrical signal by wired or wireless connections.

XII. Rules of Interpretation

Throughout the description herein and unless otherwise specified, the following terms may include and/or encompass the example meanings provided. These terms and illustrative example meanings are provided to clarify the language selected to describe embodiments both in the specification and in the appended points of focus, and accordingly, are not intended to be generally limiting. While not generally limiting and while not limiting for all described embodiments, in some embodiments, the terms are specifically limited to the example definitions and/or examples provided. Other terms are defined throughout the present description.

Some embodiments described herein are associated with a "user device" or a "network device". As used herein, the terms "user device" and "network device" may be used interchangeably and may generally refer to any device that can communicate via a network. Examples of user or network devices include a PC, a workstation, a server, a printer, a scanner, a facsimile machine, a copier, a Personal Digital Assistant (PDA), a storage device (e.g., a disk drive), a hub, a router, a switch, and a modem, a video game console, or a wireless phone. User and network devices may comprise one or more communication or network components. As used herein, a "user" may generally refer to any individual and/or entity that operates a user device.

As used herein, the term "network component" may refer to a user or network device, or a component, piece, portion, or combination of user or network devices. Examples of network components may include a Static Random Access Memory (SRAM) device or module, a network processor, and a network communication path, connection, port, or cable.

In addition, some embodiments are associated with a "network" or a "communication network". As used herein, the terms "network" and "communication network" may be used interchangeably and may refer to any object, entity, component, device, and/or any combination thereof that permits, facilitates, and/or otherwise contributes to or is associated with the transmission of messages, packets, signals, and/or other forms of information between and/or within one or more network devices. Networks may be or include a plurality of interconnected network devices. In some embodiments, networks may be hard-wired, wireless, virtual, neural, and/or any other configuration of type that is or becomes known. Communication networks may include, for example, one or more networks configured to operate in accordance with the Fast Ethernet LAN transmission standard 802.3-2002® published by the Institute of Electrical and Electronics Engineers (IEEE). In some embodiments, a network may include one or more wired and/or wireless networks operated in accordance with any communication standard or protocol that is or becomes known or practicable.

As used herein, the terms "information" and "data" may be used interchangeably and may refer to any data, text, voice, video, image, message, bit, packet, pulse, tone, waveform, and/or other type or configuration of signal and/or information. Information may comprise information packets transmitted, for example, in accordance with the Internet Protocol Version 6 (IPv6) standard as defined by "Internet Protocol Version 6 (IPv6) Specification" RFC 1883, published by the Internet Engineering Task Force (IETF), Network Working Group, S. Deering et al. (December 1995). Information may, according to some embodiments, be compressed, encoded, encrypted, and/or otherwise packaged or manipulated in accordance with any method that is or becomes known or practicable.

In addition, some embodiments described herein are associated with an "indication". As used herein, the term "indication" may be used to refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

"Determining" something can be performed in a variety of manners and therefore the term "determining" (and like terms) includes calculating, computing, deriving, looking up (e.g., in a table, database or data structure), ascertaining and the like. The term "computing" as utilized herein may generally refer to any number, sequence, and/or type of electronic processing activities performed by an electronic device, such as, but not limited to looking up (e.g., accessing a lookup table or array), calculating (e.g., utilizing multiple numeric values in accordance with a mathematic formula), deriving, and/or defining.

It will be readily apparent that the various methods and algorithms described herein may be implemented by, e.g., appropriately and/or specially-programmed computers and/or computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software.

A "processor" generally means any one or more microprocessors, CPU devices, computing devices, microcontrollers, digital signal processors, or like devices, as further described herein.

The term "computer-readable medium" refers to any medium that participates in providing data (e.g., instructions or other information) that may be read by a computer, a processor or a like device. Such a medium may take many forms, including but not limited to, non-volatile media, volatile media, and transmission media. Non-volatile media include, for example, optical or magnetic disks and other persistent memory. Volatile media include DRAM, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during RF and IR data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave, or any other medium from which a computer can read.

The term "computer-readable memory" may generally refer to a subset and/or class of computer-readable medium that does not include transmission media, such as waveforms, carrier waves, electromagnetic emissions, etc. Computer-readable memory may typically include physical media upon which data (e.g., instructions or other information) are stored, such as optical or magnetic disks and other persistent memory, DRAM, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, computer hard drives, backup tapes, Universal Serial Bus (USB) memory devices, and the like.

Various forms of computer readable media may be involved in carrying data, including sequences of instructions, to a processor. For example, sequences of instruction (i) may be delivered from RAM to a processor, (ii) may be carried over a wireless transmission medium, and/or (iii) may be formatted according to numerous formats, standards or protocols, such as ultra-wideband (UWB) radio, Bluetooth™, Wi-Fi, TDMA, CDMA, 3G, 4G, 4G LTE, 5G, etc.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device that accesses data in such a database.

The present invention can be configured to work in a network environment including a computer that is in communication, via a communications network, with one or more devices. The computer may communicate with the devices directly or indirectly, via a wired or wireless medium, such as the Internet, LAN, WAN or Ethernet, Token Ring, or via any appropriate communications means or combination of communications means. Each of the devices may comprise computers, such as those based on the Intel® Pentium® or Centrino™ processor, that are adapted to communicate with the computer. Any number and type of machines may be in communication with the computer.

XIII. Conclusion

Any of the features illustrated or described with respect to FIGS. 1A-11D can be combined with any other features illustrated or described with respect to FIGS. 1A-11D to provide systems, methods, devices, or embodiments not otherwise illustrated or specifically described herein. All features described herein are independent of one another and, except where structurally impossible, can be used in combination with any other feature described herein.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicant intends to file additional applications to pursue patents for subject matter that has been disclosed and enabled but not claimed in the present application.

It will be understood that various modifications can be made to the embodiments of the present disclosure herein without departing from the scope thereof. Therefore, the above description should not be construed as limiting the disclosure, but merely as embodiments thereof. Those skilled in the art will envision other modifications within the scope of the present disclosure.

The invention claimed is:

1. A system for moving a parked trailer, the system comprising:
one or more rear trailer hostlers, each rear trailer hostler comprising:
a vehicle chassis having a plurality of wheels and a propulsion unit constructed to drive the plurality of wheels;
a trailer lift unit disposed on the vehicle chassis;
one or more sensors configured to detect the trailer, characteristics of the trailer, or features in an environment surrounding the trailer;
a platform constructed to be positioned adjacent to a rear of a trailer;
one or more actuators coupled to the platform so as to control a height at a front end of the platform adjacent to the trailer, a height at a rear end of the platform opposite the front end, or heights at both the front and rear ends; and
a control system operatively coupled to the vehicle chassis, the trailer lift unit, and the one or more sensors, the control system comprising one or more processors and at least one memory storing computer-readable instructions that, when executed by the one or more processors, cause the one or more processors to:
position, via the propulsion unit, the vehicle chassis underneath the trailer at a first location;
actuate the trailer lift unit so as to raise the trailer from an initial height where locked wheels of the trailer contact a ground to a second height where the locked wheels are held off the ground;
maintain, via the trailer lift unit, the locked wheels off the ground as the vehicle chassis and the trailer thereon moves from the first location to a second location;
detect, via the one or more sensors, a height of a cargo bed of the trailer, a height of a floor at the second location, or both; and
control, via the one or more actuators, height of the front end based on the height of the cargo bed, the height of the rear end based on the height of the floor, or both.

2. The system of claim 1, wherein the trailer lift unit comprises one or more hydraulic rams.

3. The system of claim 1, wherein the trailer lift unit comprises a plurality of members constructed to contact the locked wheels of the trailer and to move horizontally to cause displacement of the trailer upward to the second height.

4. The system of claim 1, wherein the one or more sensors comprises a navigation unit, an inertial measurement unit, an odometer, a light detection and ranging (LIDAR) system, radio detection and ranging (RADAR) system, an infrared imager, an optical imager, a trailer weight sensor, or any combination of the foregoing.

5. The system of claim 1, wherein the trailer lift unit comprises:
a first ram constructed to displace laterally inward with respect to the vehicle chassis; or
a second ram constructed to rotate in a horizontal plane between a first position extending substantially along a longitudinal direction of the vehicle chassis and a second position extending substantially laterally inward with respect to the vehicle chassis; or
both of the first and second rams.

6. The system of claim 1, wherein, in plan view, the vehicle chassis has a U-shape, and the trailer lift unit is disposed on one or both longitudinally-extending arms of the vehicle chassis.

7. The system of claim 1, wherein the one or more rear trailer hostlers is a pair of the rear trailer hostlers, one of the pair interacting with a left side of the trailer and the other of the pair interacting with a right side of the trailer.

8. The system of claim 1, further comprising a front hostler with a fifth wheel coupler constructed to receive a kingpin of the trailer.

9. The system of claim 8, wherein:
each rear trailer hostler further comprises a communication system; and
the at least one memory stores additional computer-readable instructions that, when executed by the one or more processors, cause the one or more processors to further:
receive, via the communication system, one or more signals from the front hostler regarding travel from the first location to the second location; and
control, via the propulsion unit, the vehicle chassis to follow the front hostler based on the received one or more signals.

10. The system of claim 1, wherein the propulsion unit comprises an electric motor for each wheel.

11. The system of claim 1, wherein one or more of the plurality of wheels comprises an omnidirectional wheel.

12. A system for moving a parked trailer, the system comprising:
one or more rear trailer hostlers, each rear trailer hostler comprising:
a vehicle chassis having a plurality of wheels and a propulsion unit constructed to drive the plurality of wheels;
a trailer lift unit disposed on the vehicle chassis;
one or more sensors configured to detect the trailer, characteristics of the trailer, or features in an environment surrounding the trailer;
a platform constructed to be positioned adjacent to a rear of the trailer;
one or more actuatable safety door stops disposed within or on the platform; and
a control system operatively coupled to the vehicle chassis, the trailer lift unit, and the one or more sensors, the control system comprising one or more processors and at least one memory storing computer-readable instructions that, when executed by the one or more processors, cause the one or more processors to:
position, via the propulsion unit, the vehicle chassis underneath the trailer at a first location;
actuate the trailer lift unit so as to raise the trailer from an initial height where locked wheels of the trailer contact a ground to a second height where the locked wheels are held off the ground; and
maintain, via the trailer lift unit, the locked wheels off the ground as the vehicle chassis and the trailer thereon moves from the first location to a second location.

13. The system of claim 12, wherein the at least one memory stores additional computer-readable instructions that, when executed by the one or more processors, cause the one or more processors to further:
detect, via the one or more sensors, a speed, an acceleration, or both of opening of a door of the trailer; and deploy the one or more actuatable safety door stops in response to the detected speed, acceleration, or both exceeding a corresponding predetermined value.

14. The system of claim 12, wherein the trailer lift unit comprises a plurality of members constructed to contact the locked wheels of the trailer and to move horizontally to cause displacement of the trailer upward to the second height.

15. The system of claim 12, wherein the one or more sensors comprises a navigation unit, an inertial measurement unit, an odometer, a light detection and ranging (LIDAR) system, radio detection and ranging (RADAR) system, an infrared imager, an optical imager, a trailer weight sensor, or any combination of the foregoing.

16. The system of claim 12, wherein the trailer lift unit comprises:
 a first ram constructed to displace laterally inward with respect to the vehicle chassis; or
 a second ram constructed to rotate in a horizontal plane between a first position extending substantially along a longitudinal direction of the vehicle chassis and a second position extending substantially laterally inward with respect to the vehicle chassis; or
 both of the first and second rams.

17. The system of claim 12, wherein the one or more rear trailer hostlers is a pair of the rear trailer hostlers, one of the pair interacting with a left side of the trailer and the other of the pair interacting with a right side of the trailer.

18. The system of claim 12, further comprising a front hostler with a fifth wheel coupler constructed to receive a kingpin of the trailer.

19. The system of claim 18, wherein:
 each rear trailer hostler further comprises a communication system; and
 the at least one memory stores additional computer-readable instructions that, when executed by the one or more processors, cause the one or more processors to further:
  receive, via the communication system, one or more signals from the front hostler regarding travel from the first location to the second location; and
  control, via the propulsion unit, the vehicle chassis to follow the front hostler based on the received one or more signals.

20. The system of claim 12, wherein one or more of the plurality of wheels comprises an omnidirectional wheel.

\* \* \* \* \*